US012651955B2

(12) United States Patent
Ishizaka

(10) Patent No.: US 12,651,955 B2
(45) Date of Patent: Jun. 9, 2026

(54) HIGH SPEED SWITCHING POWER SUPPLY WITH LOW OUTPUT CURRENT RIPPLE

(71) Applicant: EDIC Systems Inc., Yokohama (JP)

(72) Inventor: Masaaki Ishizaka, Yokohama (JP)

(73) Assignee: EDIC Systems Inc., Yokohama (JP)

( * ) Notice: Subject to any disclaimer, the term of this patent is extended or adjusted under 35 U.S.C. 154(b) by 170 days.

(21) Appl. No.: 18/358,671

(22) Filed: Jul. 25, 2023

(65) Prior Publication Data

US 2025/0038639 A1     Jan. 30, 2025

(51) Int. Cl.
H02M 1/00        (2006.01)
H02M 1/14        (2006.01)
H02M 3/158       (2006.01)

(52) U.S. Cl.
CPC ............. H02M 1/007 (2021.05); H02M 1/14 (2013.01); H02M 3/1586 (2021.05)

(58) Field of Classification Search
CPC ....... H02M 3/1586; H02M 1/14; H02M 1/007
See application file for complete search history.

(56) References Cited

U.S. PATENT DOCUMENTS

| | | | | |
|---|---|---|---|---|
| 2002/0118000 | A1* | 8/2002 | Xu ........................ | H02M 3/158 |
| | | | | 323/259 |
| 2002/0135962 | A1* | 9/2002 | Tang ....................... | G06F 1/305 |
| | | | | 361/111 |
| 2005/0231177 | A1 | 10/2005 | Tateno et al. | |
| 2007/0236204 | A1 | 10/2007 | Tateno et al. | |

| | | | | |
|---|---|---|---|---|
| 2008/0129273 | A1 | 6/2008 | Tateno et al. | |
| 2009/0039843 | A1* | 2/2009 | Kudo ................... | H02M 3/1584 |
| | | | | 323/272 |
| 2009/0267587 | A1 | 10/2009 | Tateno et al. | |
| 2010/0109622 | A1 | 5/2010 | Miki et al. | |
| 2010/0176782 | A1 | 7/2010 | Kudo | |
| 2010/0225292 | A1* | 9/2010 | Nishimori ............. | H02M 3/156 |
| | | | | 323/288 |
| 2011/0204858 | A1 | 8/2011 | Kudo | |
| 2012/0217942 | A1 | 8/2012 | Kudo | |

(Continued)

FOREIGN PATENT DOCUMENTS

| | | |
|---|---|---|
| JP | 2000083374 A | 3/2000 |
| JP | 2005-304210 A | 10/2005 |

(Continued)

OTHER PUBLICATIONS

Zhibao Yan, Haiping Xu; Pulse power supply with faster response and low ripple current using inductive storage and interleaving technology; CPSS Transactions on Power control, vol. 5, Issue 1; Mar. 2020; pp. 54-62.*

(Continued)

*Primary Examiner* — Harry R Behm
(74) *Attorney, Agent, or Firm* — ANDRUS INTELLECTUAL PROPERTY LAW, LLP

(57)                 ABSTRACT

A high-speed switching power supply. The high-speed switching power supply includes a primary power supply. A plurality of switching elements are connected to the primary power supply. A plurality of coils is connected to the plurality of switching elements. A capacitor is connected to the plurality of coils. A sum of currents flowing through the plurality of coils is made constant by a means for setting or selecting a power supply voltage depending on the number of coils.

12 Claims, 18 Drawing Sheets

(56) References Cited

U.S. PATENT DOCUMENTS

| 2013/0214751 | A1  | 8/2013  | Shiraishi et al. | |
|---|---|---|---|---|
| 2014/0253066 | A1  | 9/2014  | Teh | |
| 2015/0008890 | A1* | 1/2015  | Sasao | H02M 1/088 |
| | | | | 323/271 |
| 2017/0373584 | A1* | 12/2017 | Hiyama | H02M 1/36 |
| 2019/0181761 | A1* | 6/2019  | Sano | H02M 3/155 |
| 2020/0235670 | A1* | 7/2020  | Xu | H02M 3/1584 |
| 2020/0388987 | A1* | 12/2020 | Moore | H01S 5/06808 |
| 2021/0028683 | A1* | 1/2021  | Jiang | H02M 1/084 |

FOREIGN PATENT DOCUMENTS

| JP | 2006-340442 | A  | 12/2006 |
|---|---|---|---|
| JP | 2009-044831 | A  | 2/2009  |
| JP | 2010-110106 | A  | 5/2010  |
| JP | 2012-050207 | A  | 3/2012  |
| JP | 2013-172566 | A  | 9/2013  |
| JP | 2014-171351 | A  | 9/2014  |
| JP | 2015008603  | A  | 1/2015  |
| JP | 2018-206848 | A  | 12/2018 |
| JP | 2019-205321 | A  | 11/2019 |
| JP | 2022-127010 | A  | 8/2022  |
| JP | 2023129596  | A  | 9/2023  |
| WO | 2018221356  | A1 | 12/2018 |
| WO | 2019225418  | A1 | 11/2019 |

OTHER PUBLICATIONS

Notice of Reasons for Refusal in corresponding Japanese Patent Application No. 2023-121136, dated Mar. 22, 2024.

Notice of Reasons for Refusal for Japanese Patent Application No. 2021-024916, drafted Mar. 30, 2023.

* cited by examiner

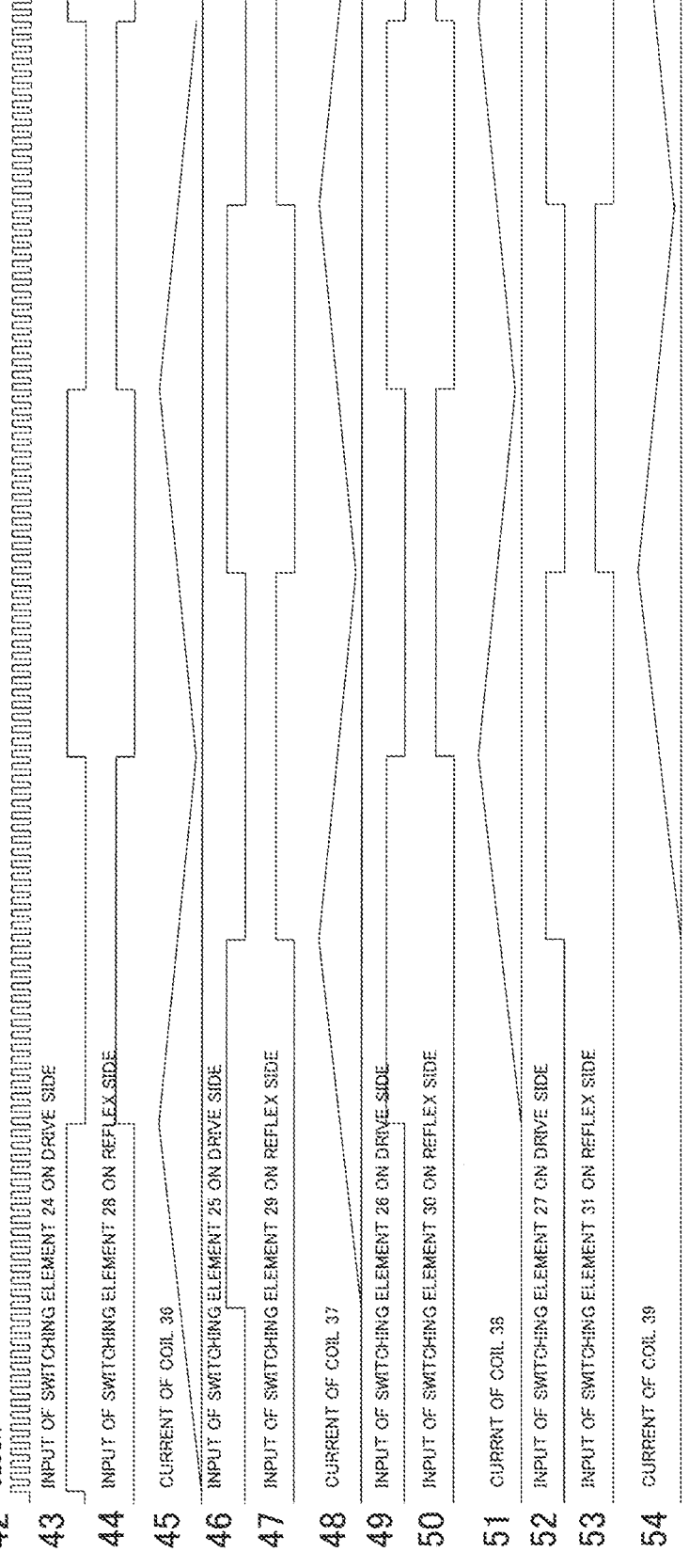

42    CLOCK

43    INPUT OF SWITCHING ELEMENT 24 ON DRIVE SIDE

44    INPUT OF SWITCHING ELEMENT 28 ON REFLEX SIDE

45    CURRENT OF COIL 36

46    INPUT OF SWITCHING ELEMENT 25 ON DRIVE SIDE

47    INPUT OF SWITCHING ELEMENT 29 ON REFLEX SIDE

48    CURRENT OF COIL 37

49    INPUT OF SWITCHING ELEMENT 26 ON DRIVE SIDE

50    INPUT OF SWITCHING ELEMENT 30 ON REFLEX SIDE

51    CURRENT OF COIL 38

52    INPUT OF SWITCHING ELEMENT 27 ON DRIVE SIDE

53    INPUT OF SWITCHING ELEMENT 31 ON REFLEX SIDE

54    CURRENT OF COIL 39

FIG. 2

150 CLOCK
151 FF 148 SET
152 FF 148 RESET
153 INPUT OF SWITCHING ELEMENT 126 ON DRIVE SIDE
154 FF 149 SET
155 FF 149 RESET
156 INPUT OF SWITCHING ELEMENT 129 ON REFLEX SIDE
157 CURRENT OF COIL 135
158 INPUT OF SWITCHING ELEMENT 127 ON DRIVE SIDE
159 INPUT OF SWITCHING ELEMENT 130 ON REFLEX SIDE
160 CURRENT OF COIL 136
161 INPUT OF SWITCHING ELEMENT 128 ON DRIVE SIDE
162 INPUT OF SWITCHING ELEMENT 131 ON REFLEX SIDE
163 CURRENT OF COIL 137

HIGH SPEED SWITCHING POWER SUPPLY WITH LOW OUTPUT CURRENT RIPPLE

TECHNICAL FIELD

The present invention relates to a switching power supply, and particularly or for example, to a power supply capable of outputting a pulse having a fast rise time used to drive a semiconductor laser.

DESCRIPTION OF THE RELATED ART

In recent years, semiconductor lasers have been increasingly used. Semiconductor lasers have an advantage of being easily installed and maintained as compared with the conventional solid laser and carbon dioxide gas laser, and thus are expected to be used more widely. Furthermore, the power of semiconductor lasers is becoming higher, accordingly there is a demand for pulse driving instead of conventional continuous driving, and high-speed pulse driving is also required. Conventionally, a dropper power supply is often used as a power supply for driving a semiconductor laser, but the dropper power supply is inefficient and thus a large amount of heat is generated and the size tends to be large. That is, laser processing machines for welding and cutting have power supply facilities of about 1 cubic meter and 50 kg in many cases, and they are water-cooled to cope with a large amount of heat generation and are not easy to use in terms of maintenance at present.

It is desirable to use a switching power supply instead of the conventional dropper power supply as a power supply for driving a semiconductor laser from the viewpoint of efficiency and miniaturization. However, the switching power supply turns on and off a power supply current by a switching element and smooths the obtained pulse waveform by a coil and a capacitor to reduce ripples of the output current. Therefore, in order to obtain a sufficiently clean power supply output, it is necessary to increase the values of the inductance of the coil and the capacitance of the capacitor, however, it is said that it is difficult to obtain a power supply output of a high-speed pulse waveform because of delay due to the coil and the capacitor. Although a normal general-purpose switching power supply may be used, this power supply has a characteristic of being efficient and capable of being miniaturized whereas a rise time thereof is as slow as several ms or more, and thus is not suitable for high-speed pulse driving necessary for laser processing. Furthermore, a multiphase switching power supply using a plurality of switching elements and coils is also proposed as shown in, for example, JP 2012-050207 A and JP 2014-171351 A.

SUMMARY

Even the above-described multiphase switching power supply is not suitable for high-speed pulse driving.

The present invention has been made to solve such conventional problems, and provides a method of using, for example, a coil and a capacitor having inductance and capacitance values as small as possible, obtaining an output waveform with many unsmoothed ripples, then by appropriately setting or selecting a power supply voltage, and combining a plurality of switching elements that are turned on and off in multiple phases, obtaining, for example, a sufficiently clean power supply output waveform having a fast rise time.

In order to achieve this object, a high-speed switching power supply of the present invention includes a primary power supply, a plurality of (multiphase) switching elements connected to the primary power supply, a plurality of (multiphase) coils connected to the plurality of switching elements, and a capacitor (including a set of capacitors) connected to the plurality of coils, and has a means (for example, a transformer) for setting or selecting a power supply voltage or a primary power supply voltage depending on the number of coils (the number of phases of the coils) to make a total sum of currents flowing through the plurality of coils (output current: current flowing through a load) constant. For example, the switching elements are disposed in parallel, the coils are connected in series to the respective switching elements, and the plurality of coils are arranged in parallel. In addition, for example, a load is connected in parallel with the capacitor such that the currents flowing through the plurality of coils are merged or combined and flow to the load (for example, a laser or a laser diode), for example.

Here, for example, each of the plurality of (multiphase) switching elements has a function of changing or controlling the current of the coil connected to the switching element, and includes a switching element on a drive side that increases the current of the coil and a switching element on a reflux side that decreases the current of the coil. For example, when the switching element on the drive side is turned on and the switching element on the reflux side is turned off, a current flows from the primary power supply to the coil via the switching element on the drive side to accumulate energy in the coil, and when the switching element on the drive side is turned off and the switching element on the reflux side is turned on, a current continues to flow while releasing energy from the switching element on the reflux side through the coil. In addition, a diode can be used instead of the switching element on the reflux side.

In the switching power supply of the present invention, the number of coils (the number of phases) is N, the currents flowing through the N coils have the same waveform, phases of the currents are shifted by $2\pi/N$, and the switching power supply can include a means for setting or selecting the power supply voltage as output voltage$\times$(1+ (number of coils in which currents have decreased)/(number of coils in which currents have increased)). The output voltage is a voltage applied to the load. The currents flowing through the N coils are controlled such that the number of coils in which currents have decreased are the same at any timing and the number of coils in which currents have increased are the same at any timing. Alternatively, the currents flowing through the N coils are controlled such that the currents increase in the former $N_{ON}/N$ of an increase/decrease cycle of the coil currents and the currents decrease in the latter $N_{OFF}/N$ of an increase/decrease cycle of the coil currents. $N_{ON}$ and $N_{OFF}$ satisfy $N = N_{ON} + N_{OFF}$ ($N_{ON}$ and $N_{OFF}$ are natural numbers). Here, the number of coils in which currents have increased is $N_{ON}$ and the number of coils in which currents have decreased is $N_{OFF}$ at any timing. In particular, the number of coils in which currents have increased can be set to a value exceeding 1. For example, the number of coils in which currents have increased can be greater than the number of coils in which currents have decreased.

In addition, the switching power supply of the present invention can include a means (for example, PWM conversion circuit or voltage-PWM conversion circuit) for controlling the plurality of switching elements to control the sum of the currents flowing through the plurality of coils (output current: current flowing through the load) to be a target value.

In addition, it is possible to include a means (for example, a switch connected to a transformer) for changing the power supply voltage or the primary power supply voltage to control the sum of the currents flowing through the plurality of coils to be a target value, for example, by changing a rate of increase of the currents flowing through the coils.

Furthermore, it is possible to include a means (for example, a switch connected to a resistor) for changing a resistance value (a resistance value of a resistor) inserted into or connected (for example, connected in series) to the plurality of switching elements to control the sum of the currents flowing to the plurality of coils to be a target value, for example, by changing a rate of decrease of the currents flowing through the coils.

Next, it is possible to include a means (for example, a switch connected to a transformer) for changing the power supply voltage or the primary power supply voltage to accelerate startup, and further include a means (a switch connected to a resistor) for changing the resistance value inserted into or connected (for example, connected in series) to the plurality of switching elements to accelerate falling.

For example, control of the plurality of switching elements, change of the power supply voltage, and change of the inserted resistance value are operated such that a larger current flows through the coils when the sum of the currents flowing through the plurality of coils is less than the target value, and a smaller current flows through the coils when the sum of the currents flowing through the plurality of coils is greater than the target value, and the sum of the currents flowing through the plurality of coils is controlled to be the target value.

Furthermore, the switching power supply of the present invention for achieving this object can have a characteristic that a resonance frequency determined by the coils and the capacitor is 0.1 times or more a switching frequency, have a characteristic of increasing or decreasing the number of phases (the number of phases to be operated) at the time of rising or according to an output current, have a characteristic of changing a clock cycle according to an output current, have a characteristic of aligning current values flowing through the plurality of coils, and have a characteristic of realizing phase compensation by digital control.

In addition, a laser device for driving a laser by the switching power supply disclosed above can be realized. A load, a laser or a laser diode is connected, for example, in series with the plurality of coils and in parallel with the capacitor.

According to the present invention, high-speed pulse driving by a switching power supply can be performed on a high-power semiconductor laser device, and precise laser processing can be realized. Furthermore, by adopting a switching power supply, efficiency improvement, downsizing, and cost reduction can be achieved.

BRIEF DESCRIPTION OF THE DRAWINGS

FIG. 2 is a diagram illustrating operation timing of the switching power supply in the first embodiment of the present invention;

DETAILED DESCRIPTION

Hereinafter, a switching power supply or a laser device of a first embodiment of the present invention will be described with reference to FIGS. 1 to 3.

The switching power supply of the first embodiment includes a primary power supply, a plurality of switching elements connected to the primary power supply, a plurality of coils connected to the plurality of switching elements, and one capacitor connected to the plurality of coils, and has a structure in which a sum of currents flowing through the plurality of coils is made constant by a means for setting or selecting a power supply voltage, that is, a primary power supply voltage.

First, a configuration of the switching power supply or a switching power supply device of the first embodiment will be described with reference to FIG. 1.

Figure 1:
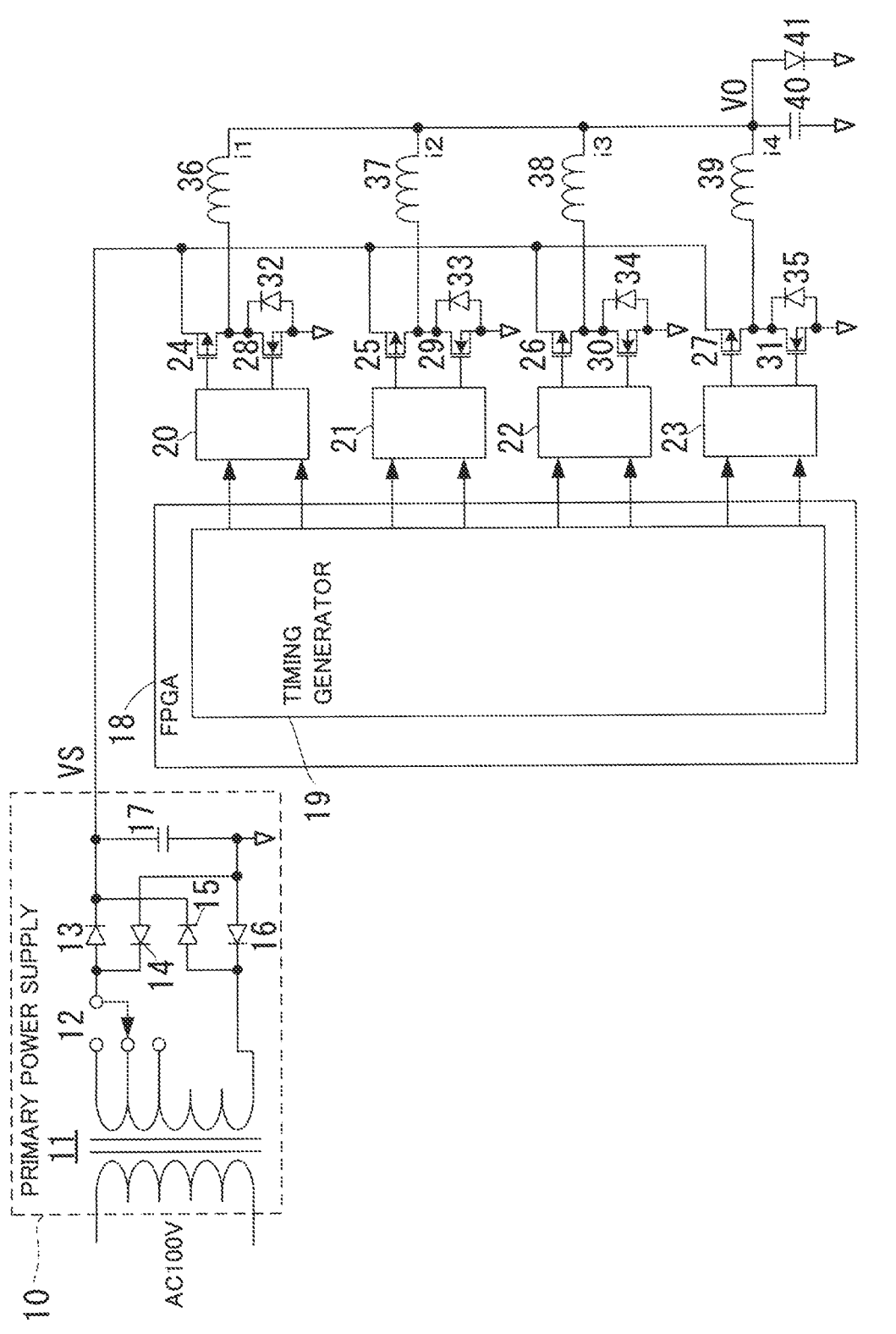
FIG. 1 is a diagram illustrating a circuit of a switching power supply or a laser device in a first embodiment of the present invention.

In FIG. 1, reference numeral 10 denotes a primary power supply. As components of the primary power supply 10, a power transformer 11 has a structure in which a plurality of taps are drawn out on the secondary side and an output voltage on the secondary side can be selected. A switch 12 enables setting or selection of a power supply voltage to be applied to the switching power supply or the main body of the switching power supply by selecting the plurality of taps provided on the secondary side of the power transformer 11 as will be described later. Rectifier diodes 13, 14, 15, and 16 perform bridge rectification. A capacitor 17 converts the pulsating current obtained by the rectifier diodes 13, 14, 15, and 16 into a direct current to obtain a primary power supply voltage applied to the switching power supply or the main body of the switching power supply.

A field programmable gate array (FPGA) 18 has a function of performing overall control. A timing generator 19 has a function of generating timing pulses having different phases at a cycle of approximately 1 μs to 3 μs.

Level conversion circuits 20, 21, 22, and 23 convert timing pulses provided from the timing generator 19 into pulses for driving the switching elements. Switching elements 24, 25, 26, and 27 on a drive side use P-channel FETs and have source terminals connected to the primary power supply voltage. Switching elements 28, 29, 30, and 31 on a reflux side use N-channel FETs and have drain terminals connected to drain terminals of the switching elements 24, 25, 26, and 27 on the drive side. Diodes 32, 33, 34, and 35 on the reflux side realize high-speed current switch using Schottky diodes and are connected in parallel to the switching elements 28, 29, 30, and 31 on the reflux side. Although the diodes on the reflux side operate integrally with the switching elements on the reflux side, it is also possible to omit the switching elements on the reflux side and provide the role to only the diodes on the reflux side. Coils 36, 37, 38, and 39 having cores on which a plurality of windings are applied have an appropriate identical inductance value and serve to change currents flowing from the drain terminals of the switching elements 24, 25, 26, and 27 on the drive side or the drain terminals of the switching elements 28, 29, 30, and 31 on the reflux side with a gentle gradient. A capacitor 40 serves to maintain a constant voltage by receiving currents flowing from the coils 36, 37, 38, and 39. It is also possible to dispose a plurality of capacitors in series or in parallel as long as they have substantially the same function as the capacitor 40. A semiconductor laser diode 41 serving as a load is connected in series to the coils 36, 37, 38, and 39 and connected in parallel to the capacitor 40, and has a property of gradually increasing from a both-end voltage of about 1.8 V to about 2.1 V with respect to a current applied as the current increases similarly to a normal diode. In order to obtain higher optical power, a plurality of semiconductor laser diodes may be connected in series, and in that case, a higher applied voltage is required depending on the number of connections. The switching element 24 on the drive side and the switching element 28 on the reflux side constitute one set or one phase of switching elements, the switching element 25 on the drive side and the switching element 29 on the reflux side constitute one set or one phase of switching elements, the switching element 26 on the drive side and the switching element 30 on the reflux side constitute one set or one phase of switching elements, and the switching element 27 on the drive side and the switching element 31 on the reflux side constitute one set or one phase of switching elements.

Next, the operation of the switching power supply of the first embodiment will be described with reference to FIG. 2.

In FIG. 2, reference numeral 42 denotes a clock signal having a cycle of about 10 ns to 100 ns output from the timing generator 19, which serves as a foundation of operation of a high-speed switching power supply. Reference numeral 43 denotes timing pulses output from the timing generator 19, which are applied to the switching element 24 on the drive side through the level conversion circuit 20. When the timing pulses are ON, the switching element 24 on the drive side is ON, and the primary power supply voltage is applied to the coil 36 to increase a coil current i1. Reference numeral 44 denotes timing pulses output from the timing generator 19, which are applied to the switching element 28 on the reflux side through the level conversion circuit 20. When the timing pulses are ON, the switching element 28 on the reflux side is ON to absorb the coil current i1 flowing through the coil 36. Reference numeral 45 represents change in the current i1 of the coil 36, and the current repeatedly increases and decreases by the operations of the switching element 24 on the drive side and the switching element 28 on the reflux side. When the switching element 24 on the drive side is ON, the switching element 28 on the reflux side is OFF, and when the switching element 24 on the drive side is OFF, the switching element 28 on the reflux side is ON. At this time, when the switching element 24 on the drive side and the switching element 28 on the reflux side are ON simultaneously, a through current is generated in the switching element 24 on the drive side and the switching element 28 on the reflux side, and thus it is desirable that the timing 44 rise later than falling of the timing 43 and falls earlier than rising of the timing 43.

Reference numeral 46 denotes timing pulses output from the timing generator 19, which are applied to the switching element 25 on the drive side through the level conversion circuit 21. When the timing pulses are ON, the switching element 25 on the drive side is ON, and the primary power supply voltage is applied to the coil 37 to increase a coil current i2. Reference numeral 47 denotes timing pulses output from the timing generator 19, which are applied to the switching element 29 on the reflux side through the level conversion circuit 21. When the timing pulses are ON, the switching element 29 on the reflux side is ON to absorb the coil current i2 flowing through the coil 37. Reference numeral 48 represents change in the current i2 of the coil 37, and the current repeatedly increases and decreases by the operations of the switching element 25 on the drive side and the switching element 29 on the reflux side. The timing 46 and the timing 47 are operated later than the timing 43 and the timing 44 by ¼ cycle (phase of 2π/4).

Reference numeral 49 denotes timing pulses output from the timing generator 19, which are applied to the switching element 26 on the drive side through the level conversion circuit 22. When the timing pulses are ON, the switching element 26 on the drive side is ON, and the primary power supply voltage is applied to the coil 38 to increase a coil current i3. Reference numeral 50 denotes timing pulses output from the timing generator 19, which are applied to the switching element 30 on the reflux side through the level conversion circuit 22. When the timing pulses are ON, the switching element 30 on the reflux side is ON to absorb the coil current i3 flowing through the coil 38. Reference numeral 51 represents change in the current i3 of the coil 38, and the current repeatedly increases and decreases by the operations of the switching element 26 on the drive side and the switching element 30 on the reflux side. The timing 49 and the timing 50 are operated later than the timing 43 and the timing 44 by ½ cycle (phase of 2π/2).

Reference numeral 52 denotes timing pulses output from the timing generator 19, which are applied to the switching element 27 on the drive side through the level conversion circuit 23. When the timing pulses are ON, the switching element 27 on the drive side is ON, and the primary power supply voltage is applied to the coil 39 to increase a coil current i4. Reference numeral 53 denotes timing pulses output from the timing generator 19, which are applied to the switching element 31 on the reflux side through the level conversion circuit 23. When the timing pulses are ON, the switching element 31 on the reflux side is ON to absorb the coil current i4 flowing through the coil 39. Reference numeral 54 represents change in the current i4 of the coil 39, and the current repeatedly increases and decreases by the operations of the switching element 27 on the drive side and the switching element 31 on the reflux side. The timing 52 and the timing 53 are operated later than the timing 43 and the timing 44 by ¾ cycle (phase of $2\pi \times \frac{3}{4}$).

In the above description, it is assumed that the number of coils N=4, currents flowing through the N or N-phase coils have the same waveform, and the phases are shifted by $2\pi/N$ ($2\pi/4$).

In the switching power supply of the first embodiment, setting or selection of a power supply voltage as means for making the sum of currents flowing through the plurality of coils constant is performed in addition to the above operation. That is, the power supply voltage VS is set or selected such that VS=VO×(1+(NOFF/NON)) where the output voltage is VO, the number of coils in which currents have increased is NON, and the number of coils in which currents have decreased is NOFF. This principle will be described with reference to FIGS. 2 and 3.

In FIG. 1, the primary power supply 10 supplies the primary power supply voltage VS to the switching power supply or the main body of the switching power supply. When the switching element 24 on the drive side is ON, the current i1 flowing through the coil 36, indicated by 45 in FIG. 2, becomes or reaches an increase amount i1ON in the following formula after T seconds where the power supply voltage of the primary power supply is VS, the laser power supply output (output voltage of a load or the laser diode 41, a voltage applied to the load or the laser diode 41) is VO, and the value of the inductance of the coil 36 is L.

$$i1ON = (VS - VO) \times T/L$$

When the switching element 24 on the drive side is ON, the current i1 flowing through the coil 36, indicated by 45 in FIG. 2, becomes or reaches a decrease amount i1OFF in the following formula after T seconds.

$$i1OFF = -(VO \times T/L)$$

Since the same primary power supply voltage VS is also applied to the current i2 flowing through the coil 37, indicated by 48 in FIG. 2, the current i3 flowing through the coil 38, indicated by 51 in FIG. 2, and the current i4 flowing through the coil 39, indicated by 54 in FIG. 2, an increase amount i2ON of the current i2 after T seconds, a decrease amount i2OFF of the current i2 after T seconds, an increase amount i3ON of the current i3 after T seconds, a decrease amount i3OFF of the current i3 after T seconds, an increase amount i4ON of the current i4 after T seconds, and a decrease amount i4OFF of the current i4 after T seconds are the same as i1ON and i1OFF in the case of the aforementioned current i1. That is, in any of the coils 36, 37, 38, and 39, an increase amount iLON after T seconds is (VS−VO)× T/L and a decrease amount iLOFF after T seconds is −(VO×T/L). Although the laser output current corresponds to the sum of i1, i2, i3, and i4, in order to maintain a constant value, the sum (iLON×NON+iLOFF×NOFF) of the sum of current increase amounts of coils having a current increase and the sum of current decrease amounts of coils having a current decrease needs to be 0 at any timing with respect to the currents flowing through the coils, indicated by 45, 48, 51, and 54 in FIG. 2. That is, the following formula needs to be established.

$$iLON \times NON + iLOFF \times NOFF =$$
$$(VS - VO) \times T/L \times NON - VO \times T/L \times NOFF = 0$$

Accordingly, $$VS = VO \times (1 + (NOFF/NON))$$

is obtained.

The timings of the coil currents i1, i2, i3, and i4 indicated by 45, 48, 51, and 54 in FIG. 2 in the switching power supply of the first embodiment have a repeating cycle in which the first half increases and the second half decreases or are considered to have a repeating cycle in which the first half increases and the second half decreases, and thus VS is represented by the following formula because $$NON = NOFF = 2.$$

$$VS = 2 \times VO$$

Figure 3:
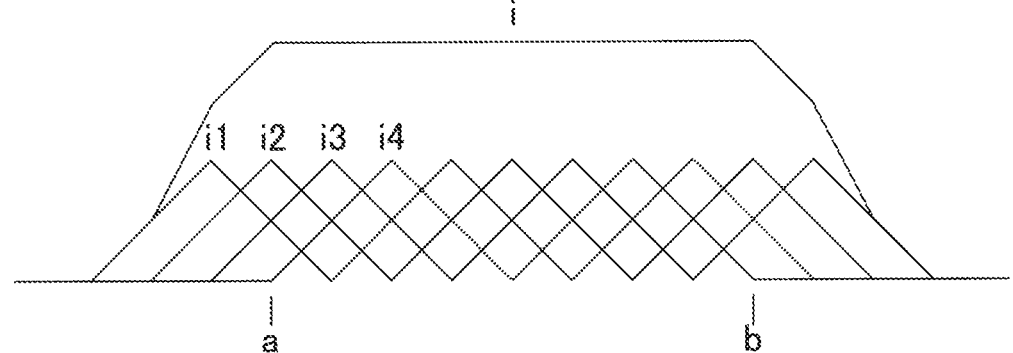
FIG. 3 is a diagram illustrating current synthesis of the switching power supply in the first embodiment of the present invention.

FIG. 3 illustrates changes in the coil currents i1, i2, i3, and i4 indicated by 45, 48, 51, and 54 in FIG. 2 in the switching power supply of the first embodiment. As illustrated in FIG. 3, the currents i1, i2, i3, and i4 flowing through the coil 36, the coil 37, the coil 38, and the coil 39 have triangular waves with same upward gradients and same downward gradients, that is, triangular waves with an equal waveform, and the laser output current i, which is the sum of currents flowing into the capacitor 40, is i1+i2+i3+i4 and has a flat constant value in the section of a to b.

The power supply voltage VS can be set or selected differently, and if NON=3 and NOFF=1, that is, if the coil currents are triangular waves having an equal waveform with a repeating cycle in which the former ¾ increases and the latter ¼ decreases, VS is represented by the following formula, and the laser output current can be a flat constant value.

$$VS = 4/3 \times V0$$

That is, assuming a power supply voltage that is 4/3 times the output voltage VO and a current having the same waveform with a phase shifted by π/2 and increasing in the former ¾ of the repeating cycle and decreasing in the latter ¼ of the repeating cycle, the laser output current can similarly obtain a constant value.

Since some resistance values exist in the switching elements 24, 25, 26, and 27 on the drive side, and the switching elements 28, 29, 30, and 31 on the reflux side and the coils 36, 37, 38, and 39 illustrated in FIG. 1, the influence thereof may be corrected to the power supply voltage. In addition, in a case where the output voltage required by the semiconductor laser diode has a fixed value and the waveform of the current flowing through a coil is one type, it is sufficient that there is a corresponding fixed primary power supply voltage, and thus the plurality of taps and switches 12 of the power transformer 11 in FIG. 1 are unnecessary. However, in a case where the output voltage required by the semiconductor laser diode changes or when there are a plurality of types of waveforms of currents flowing through the coils and the waveforms can change, it is necessary to configure the primary power supply voltage (tap) such that a plurality of corresponding primary power supply voltages can be obtained.

The number of coils can be selected according to the configuration of the semiconductor laser diode serving as a load and an allowable amount of ripples. The power supply voltage according to a combination of NON and NOFF and a combination of an increase time and a decrease time with respect to the number of coils is provided, for example, by the following Table 1. In Table 1, the waveforms of currents flowing through respective coils are the same, and the phases are shifted by 2π/number of coils.

TABLE 1

| Number of coils | NON | NOFF | Power supply voltage | Increase time | Decrease time |
|---|---|---|---|---|---|
| 3 | 2 | 1 | $\frac{3}{2}$*VO | $\frac{2}{3}$ | $\frac{1}{3}$ |
| 4 | 2 | 2 | 2*VO | $\frac{1}{2}$ | $\frac{1}{2}$ |
| 4 | 3 | 1 | $\frac{4}{3}$*VO | $\frac{3}{4}$ | $\frac{1}{4}$ |
| 5 | 2 | 3 | $\frac{5}{2}$*VO | $\frac{2}{5}$ | $\frac{3}{5}$ |
| 5 | 3 | 2 | $\frac{5}{3}$*VO | $\frac{3}{5}$ | $\frac{2}{5}$ |
| 6 | 3 | 3 | 2*VO | $\frac{1}{2}$ | $\frac{1}{2}$ |
| 6 | 4 | 2 | $\frac{3}{2}$*VO | $\frac{2}{3}$ | $\frac{1}{3}$ |
| 7 | 3 | 4 | $\frac{7}{3}$*VO | $\frac{3}{7}$ | $\frac{4}{7}$ |
| 7 | 4 | 3 | $\frac{7}{4}$*VO | $\frac{4}{7}$ | $\frac{3}{7}$ |
| 8 | 4 | 4 | 2*VO | $\frac{1}{2}$ | $\frac{1}{2}$ |
| 8 | 5 | 3 | $\frac{8}{5}$*VO | $\frac{5}{8}$ | $\frac{3}{8}$ |
| 9 | 6 | 3 | $\frac{3}{2}$*VO | $\frac{2}{3}$ | $\frac{1}{3}$ |
| 10 | 6 | 4 | $\frac{5}{3}$*VO | $\frac{3}{5}$ | $\frac{2}{5}$ |
| 12 | 8 | 4 | $\frac{3}{2}$*VO | $\frac{2}{3}$ | $\frac{1}{3}$ |

By increasing NON, the power supply voltage can be gradually decreased from a large value to a low value. That is, NON of two or more is effective. In addition, by making the number of NON larger than the number of NOFF, the power supply voltage can be made smaller than 2*VO.

In general, if the power supply voltage is lowered, the following advantages are obtained. As the drive-side switching elements 24, 25, 26, and 27 and the reflux-side switching elements 28, 29, 30, and 31 to be used, inexpensive ones having a low withstand voltage can be used. In addition, it is known that a switching loss when a switching regulator operates decreases as the power supply voltage decreases, and it is possible to reduce heat generation of the switching elements and energy loss in the switching regulator.

In a conventional switching power supply including a plurality of coils, inductance values of coils corresponding to the coils 36, 37, 38, and 39 of the present invention and a capacitance value of a capacitor corresponding to the capacitor 40 are increased to keep the sum of currents flowing through the coils at a constant value as an average value.

The high-speed switching power supply according to the present invention has a different feature that the sum of currents is kept at a constant value at each moment. Therefore, minute or small values can be applied as the inductances of the coil 36, the coil 37, the coil 38, and the coil 39 and the capacitance of the capacitor 40 of the present invention. With this feature, the rise of the laser power supply output can be increased or speeded up, and thus a high-speed switching power supply can be realized.

Hereinafter, a switching power supply or a laser device of a second embodiment of the present invention will be described with reference to FIGS. 4 to 6.

The switching power supply of the second embodiment includes a primary power supply, a plurality of switching elements connected to the primary power supply, a plurality of coils connected to the plurality of switching elements, and one capacitor connected to the plurality of coils, and has a structure in which a sum of currents flowing through the plurality of coils is made constant, that is, an amount of ripples is reduced, and the sum is controlled to be a target value by a means for setting or selecting a power supply voltage, that is, a primary power supply voltage, and a means for controlling the switching elements.

First, a configuration of the switching power supply of the second embodiment will be described with reference to FIG. 4.

Figure 4:
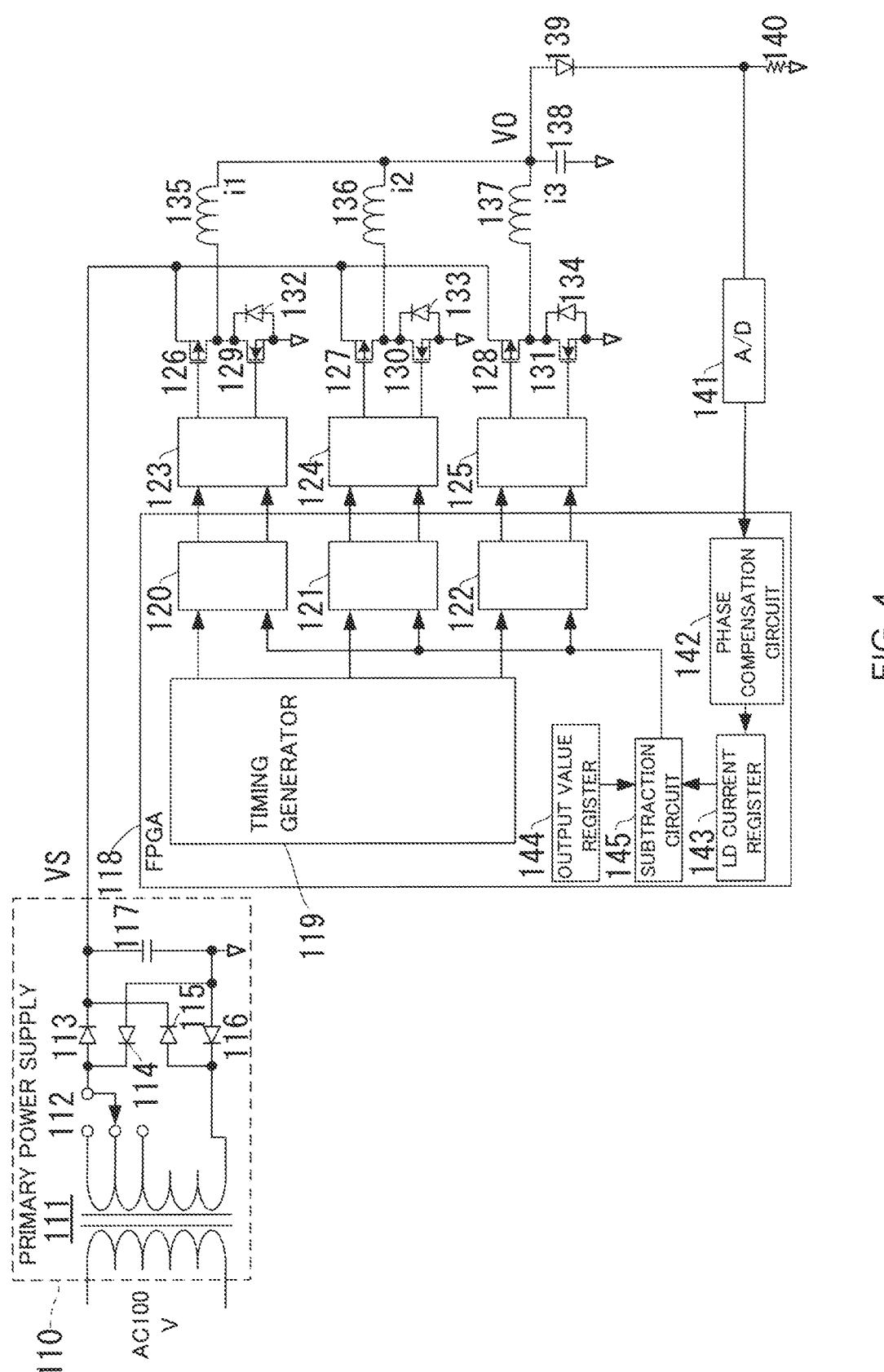
FIG. 4 is a diagram illustrating a circuit of a switching power supply or a laser device in a second embodiment of the present invention.

In FIG. 4, reference numeral 110 denotes a primary power supply. As components of the primary power supply 110, a power transformer 111 has a structure in which a plurality of taps are drawn out on the secondary side and an output voltage on the secondary side can be selected. A switch 112 enables setting or selection of a power supply voltage to be applied to the switching power supply or the main body of the switching power supply by selecting the plurality of taps provided on the secondary side of the power transformer 111 as will be described later. Rectifier diodes 113, 114, 115, and 116 perform bridge rectification. A capacitor 117 converts the pulsating current obtained by the rectifier diodes 113, 114, 115, and 116 into a direct current to obtain a primary power supply voltage applied to the switching power supply or the main body of the switching power supply.

A field programmable gate array (FPGA) 118 has a function of performing overall control. A timing generator 119 has a function of generating timing pulses having different phases at a cycle of approximately 1 us to 3 μs. Voltage-pulse width modulation (PWM) conversion circuits 120, 121, and 122 have a function of converting a differential voltage value of an output into a pulse duration. Level conversion circuits 123, 124, and 125 convert timing pulses supplied from the voltage-PWM conversion circuits 120, 121, and 122 into pulses for driving switching elements. Switching elements 126, 127, and 128 on the drive side use P-channel FETs and have source terminals connected to the primary power supply voltage. Switching elements 129, 130, and 131 on the reflux side use N-channel FETs and have drain terminals connected to drain terminals of the switching elements 126, 127, and 128 on the drive side. Diodes 132, 133, and 134 on the reflux side realize high-speed current switching using Schottky diodes and are connected in parallel to the switching elements 129, 130, and 131 on the reflux side. Coils 135, 136, and 137 having cores on which a plurality of windings are applied have an appropriate identical inductance value and serve to change currents flowing from the drain terminals of the switching elements 126, 127, and 128 on the drive side or the drain terminals of the switching elements 129, 130, and 131 on the reflux side with a gentle gradient. A capacitor 138 serves to maintain a constant voltage by receiving currents flowing from the coils 135, 136, and 137. A semiconductor laser diode 139 serving as a load is connected in series to the coils 135, 136, and 137 and connected in parallel to the capacitor 138, and has a property of gradually increasing from a both-end voltage of about 1.8 V to about 2.1 V with respect to a current applied as the current increases similarly to a normal diode. A current detection resistor 140 measures a current flowing through the semiconductor laser diode 139, and a resistance capable of flowing a large current of about several 10 mΩ is used as the current detection resistor. In order to obtain higher optical power, a plurality of semiconductor laser diodes may be connected in series, and in that case, a higher applied voltage is required depending on the number of connections. The switching element 126 on the drive side and the switching element 129 on the reflux side constitute one set or one phase of switching elements, the switching element 127 on the drive side and the switching element 130 on the reflux side constitute one set or one phase of switching elements, and the switching element 128 on the drive side and the switching element 131 on the reflux side constitute one set or one phase of switching elements.

An A/D converter 141 converts the voltage across the current detection resistor 140 into a numerical value and quantifies the current flowing through the semiconductor laser diode 139. A phase compensation circuit 142 including a digital filter serves to perform phase compensation such that a control loop does not oscillate even when the value of the current flowing through the semiconductor laser diode 139 is strongly controlled. A laser current register 143 holds the output of the phase compensation circuit 142. An output value register 144 holds a target current value flowing through the semiconductor laser diode 139. A subtraction circuit 145 compares the value of the laser current register 143 with the value of the output value register 144, and outputs a differential voltage value between a target current value flowing through the semiconductor laser diode 139 and an actual current value flowing through the semicon-ductor laser diode 139.

Next, a configuration of a voltage-PWM conversion circuit with respect to the switching power supply of the second embodiment will be described with reference to FIG. 5.

Figure 5:
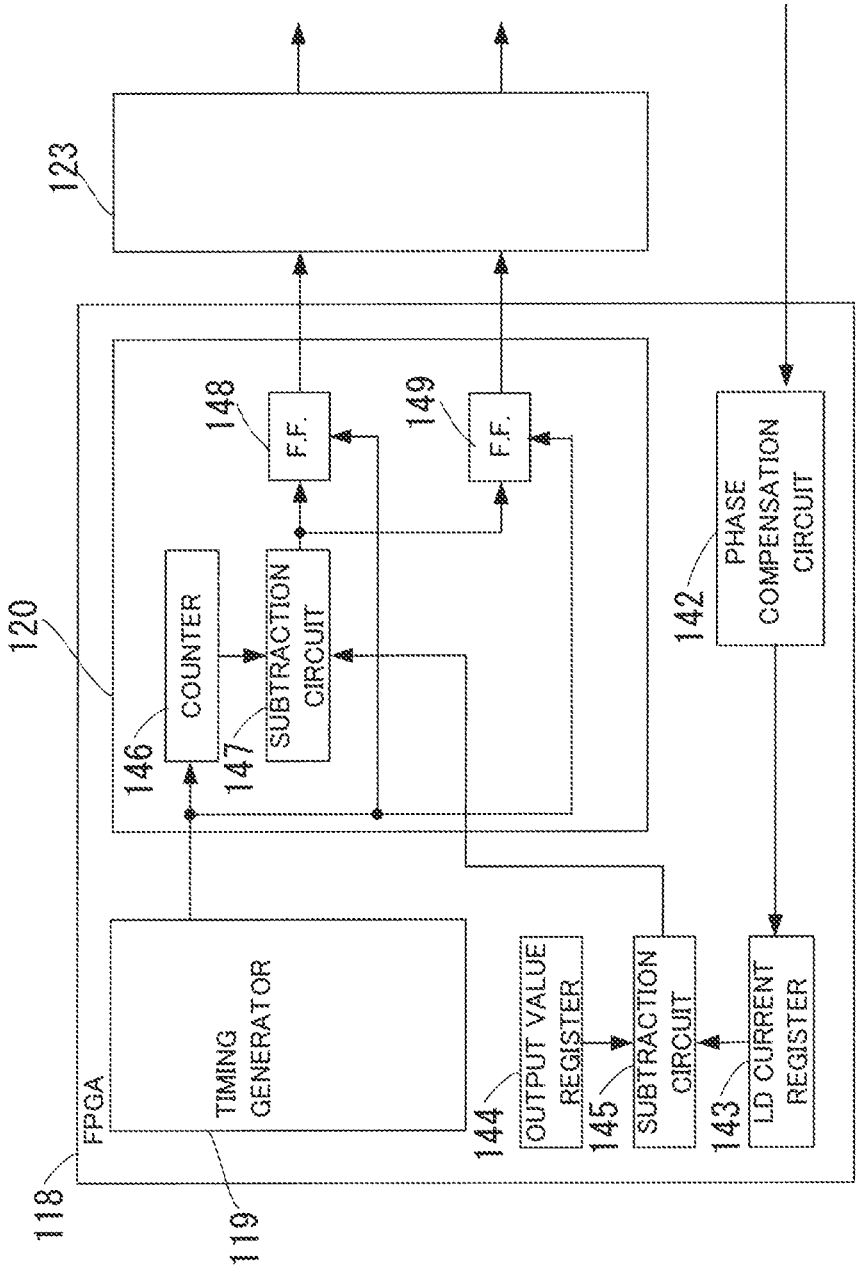
FIG. 5 is a diagram illustrating one voltage-PWM conversion circuit in the second embodiment of the present invention.
Figure 6:
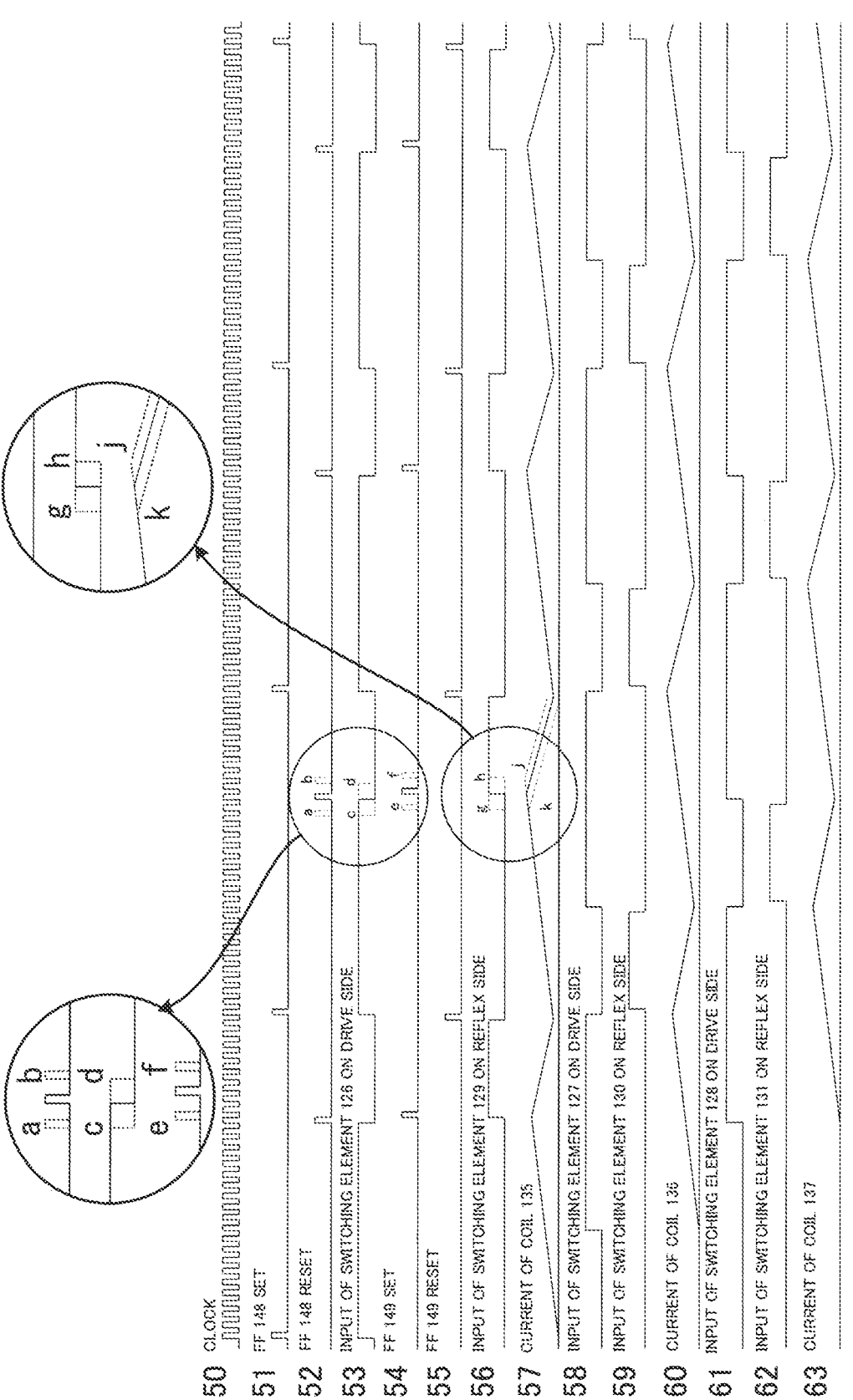
FIG. 6 is a diagram illustrating an operation timing of the switching power supply in the second embodiment of the present invention.

In FIG. 5, the FPGA 118, timing generator 119, phase compensation circuit 142, laser current register 143, output value register 144, subtraction circuit 145, and level conversion circuit 123 are illustrated in FIG. 4. FIG. 5 illustrates a configuration of the voltage-PWM conversion circuit 120. Although the voltage-PWM conversion circuits 121 and 122 are not illustrated, the voltage-PWM conversion circuits 121 and 122 have a configuration similar or identical to the voltage-PWM conversion circuit 120.

The voltage-PWM conversion circuits 120, 121, and 122 have a function of converting a differential voltage value of an output into a pulse duration. As components of the voltage-PWM conversion circuits 120, 121, and 122, a counter 146 receives a reference pulse from the timing generator 119 and outputs a numerical value that increases with time to generate drive and reflux timings. A subtraction circuit 147 compares the output provided from the counter 146 with a differential voltage value that is the output of the subtraction circuit 145 through subtraction, and outputs a pulse when the output becomes equal to the differential voltage value.

A flip-flop (F.F.) 148 that provides a driving timing has a function of receiving the reference pulse from the timing generator 119 and the output of the subtraction circuit 147, generating a pulse with a short width if the differential voltage value is small to shorten a driving time of the switching elements 126, 127, and 128 on the drive side, and generating a pulse with a long width if the differential voltage value is large to extend the driving time of the switching elements 126, 127, and 128 on the drive side. A flip-flop (F.F.) 149 that provides a reflux timing has a function of receiving the reference pulse from the timing generator 119 and the output of the subtraction circuit 147, generating a pulse with a long width if the differential voltage value is small to extend a driving time of the switching elements 129, 130, and 131 on the reflux side, and generating a pulse with a short width if the differential voltage value is large to shorten the driving time of the switching elements 129, 130, and 131 on the reflux side.

Next, the operation of the switching power supply of the second embodiment will be described with reference to FIG. 6.

First, an operation related to the voltage-PWM conversion circuit 120 in FIG. 4 will be described. In FIG. 6, reference numeral 150 denotes a clock signal having a cycle of about 10 ns to 100 ns output from timing generator 119, which serves as a foundation of operation of the switching power supply. Reference numeral 151 denotes a timing at which the counter 146 is reset and the flip-flop 148 is set in FIG. 5, and in the present embodiment, a pulse is regularly provided every 3 us from the timing generator 119. Reference numeral 152 denotes a reset timing of the flip-flop 148, and the generation position varies due to a pulse output from the subtraction circuit 147. Reference numeral 153 denotes an input of an output signal of the flip-flop 148 to the switching element 126 on the drive side through the level conversion circuit 123, ON and OFF of the input are repeated according to the set timing and the reset timing of the flip-flop 148, and when this input is ON, the switching element 126 on the drive side is driven. Reference numeral 154 denotes a set timing of the flip-flops 149, and in the present embodiment, the generation position varies due to a pulse output from the subtraction circuit 147. Reference numeral 155 denotes a reset timing of the flip-flop 149, and a pulse is regularly provided every 3 us from the timing generator 119. Refer-ence numeral 156 denotes an input of an output signal of the flip-flop 149 to the switching element 129 on the reflux side through the level conversion circuit 123, ON and OFF of the input are repeated according to the set timing and the reset timing of the flip-flop 149, and when this input is ON, the switching element 129 on the reflux side is driven. Refer-ence numeral 157 represents change in a current i1 of the coil 135, and the current i1 repeatedly increases and decreases by the operations of the switching element 126 on the drive side and the switching element 129 on the reflux side. When the switching element 126 on the drive side is ON, the switching element 129 on the reflux side is OFF, and when the switching element 126 on the drive side is OFF, the switching element 129 on the reflux side is ON. At this time, when the switching element 126 on the drive side and the switching element 129 on the reflux side are simultaneously ON, a through current is generated in the switching element 126 on the drive side and the switching element 129 on the reflux side, and thus it is desirable that the set timing 154 of the flip-flop 149 be slightly later than the reset timing 152 of the flip-flop 148 and the reset timing 155 of the flip-flop 149 be slightly earlier than the set timing 151 of the flip-flop 148.

Next, an operation related to the voltage-PWM conversion circuit 121 in FIG. 4 will be described. Similarly to the voltage-PWM conversion circuit 120, the voltage-PWM conversion circuit 121 includes the counter 146, the subtraction circuit 147, and the flip-flops 148 and 149, receives the outputs of the timing generator 119 and the subtraction circuit 145, and operates similarly to the voltage-PWM conversion circuit 120. In FIG. 6, the set/reset timings of the flip-flop 148 and the set/reset timings of the flip-flop 149 of the voltage-PWM conversion circuit 121 are basically delayed by ⅓ cycle from the set/reset timings of the flip-flop 148 and the set/reset timings of the flip-flop 149 of the voltage-PWM conversion circuit 120. In addition, the reset timing of the flip-flop 148 and the set timing of the flip-flops 149 are not illustrated although the generation positions thereof are varied by pulses output from the subtraction circuit 147. Reference numeral 158 in FIG. 6 denotes an input signal to the switching element 127 on the drive side, and when this input is ON for a period from setting to resetting of the flip-flop 148, the switching element 127 on the drive side is driven. Reference numeral 159 denotes an input signal to the switching element 130 on the reflux side, and when this input is ON for a period from setting to resetting of the flip-flop 149, the switching element 130 on the reflux side is driven. Reference numeral 160 represents change in a current i2 of the coil 136, and the current i2 repeatedly increases and decreases by the operations of the switching element 127 on the drive side and the switching element 130 on the reflux side. Such pulse signals 158 and 159 basically operate at a timing delayed by ⅓ cycle from the pulse signals (signals indicated by solid lines) indicated at the timing 153 and the timing 156.

Next, an operation related to the voltage-PWM conversion circuit 122 in FIG. 4 will be described. Similarly to the voltage-PWM conversion circuit 120, the voltage-PWM conversion circuit 122 includes the counter 146, the subtraction circuit 147, and the flip-flops 148 and 149, receives the outputs of the timing generator 119 and the subtraction circuit 145, and operates similarly to the voltage-PWM conversion circuit 120. In FIG. 6, the set/reset timings of the flip-flop 148 and the set/reset timings of the flip-flop 149 of the voltage-PWM conversion circuit 122 are basically delayed by ⅔ cycle from the set/reset timings of the flip-flop 148 and the set/reset timings of the flip-flop 149 of the voltage-PWM conversion circuit 120. In addition, the reset timing of the flip-flop 148 and the set timing of the flip-flops 149 are not illustrated although the generation positions thereof are varied by pulses output from the subtraction circuit 147. Reference numeral 161 in FIG. 6 denotes an input signal to the switching element 128 on the drive side, and when this input is ON for a period from setting to resetting of the flip-flop 148, the switching element 128 on the drive side is driven. Reference numeral 162 denotes an input signal to the switching element 131 on the reflux side, and when this input is ON for a period from setting to resetting of the flip-flop 149, the switching element 131 on the reflux side is driven. Reference numeral 163 represents change in a current i3 of the coil 137, and the current i3 repeatedly increases and decreases by the operations of the switching element 128 on the drive side and the switching element 131 on the reflux side. Such pulse signals 161 and 162 basically operate at a timing delayed by ⅔ cycle from the pulse signals (signals indicated by solid lines) indicated at the timing 153 and the timing 156.

In the configuration of FIG. 4, the number of phases is three, and the currents i1, i2, and i3 (coil currents 157, 160, and 163 in FIG. 6) flowing through the coils 135, 136, and 137 have the same waveform in which the former ⅔ increases or rises and the latter ⅓ decreases or falls, and the phases thereof are shifted by 2π/3 (coil currents indicated by solid lines in FIG. 6), basically, that is, if target value control or feedback control of the currents is not performed, and thus the number of phases 3, NON2, and NOFF1 are selected from Table 1 showing a power supply voltage, increase time, and decrease time depending on the number of coils, and the voltage of the primary power supply 110 is set to (3/2)×output voltage VO (voltage drop by the current detection resistor 140 is negligibly small). When the circuits illustrated in FIGS. 4 and 5 are operated at the timings of FIG. 6, the currents from the switching elements 126, 127, and 128 on the drive side and the switching elements 129, 130, and 131 on the reflux side flow to the coils 135, 136, and 137, and the capacitor 138 receives the currents i1, i2, and i3 flowing from the coils 135, 136, and 137 to maintain a constant voltage, and can flow a current without ripples into the semiconductor laser diode 139.

On the other hand, a function of controlling this current to be a target value is required. In order to realize this function, the laser current register 143 is provided through the current detection resistor 140, the A/D converter 141, and the phase compensation circuit 142, and the laser current register 143 is set to a value proportional to the current flowing through the laser diode 139. The value of the laser current register 143 is compared with a target laser current preset in the output value register 144 by the subtraction circuit 145 to generate a differential voltage value.

When the actual current value flowing through the laser diode 139 is greater than the target current value, a large value is held in the laser current register 143 and compared with the value of the output value register 144 by the subtraction circuit 145 to output a small differential voltage value. The output provided from the counter 146 in each of the voltage-PWM conversion circuits 120, 121, and 122 and the differential voltage value of the subtraction circuit 145 are compared through subtraction in the subtraction circuit 147, and a pulse is output when they become equal. Specifically, in the voltage-PWM conversion circuit 120, the pulse is a reset pulse to the flip-flop 148 at an early position (a) indicated on 152 of FIG. 6, and is a pulse having a short width (c) to the input of the switching element 126 on the drive side, indicated on 153. Furthermore, a pulse is a set pulse to the flip-flop 149 at an early position (e) indicated on 154, and is a pulse having a long width (g) to the input of the switching element 129 on the reflux side indicated on 156. That is, if the timing of output from the subtraction circuit 147 in the voltage-PWM conversion circuits 120, 121, and 122 is early, a duration for which the switching elements 126, 127, and 128 on the drive side are ON becomes narrow and a duration for which the switching elements 129, 130, and 131 on the reflux side are ON becomes wide. As a result, the current i1 of the coil 135 indicated by 157 becomes a small value of (k), for example.

When the actual current value flowing through the laser diode 139 is less than the target current value, a small value is held in the laser current register 143 and compared with the value of the output value register 144 through the subtraction circuit 145 to output a large differential voltage value. The output provided from the counter 146 in each of the voltage-PWM conversion circuits 120, 121, and 122 and the differential voltage value of the subtraction circuit 145 are compared through subtraction in the subtraction circuit 147, and a pulse is output when they become equal. Specifically, in the voltage-PWM conversion circuit 120, the pulse is a reset pulse to the flip-flop 148 at a delayed position (b) indicated on 152 of FIG. 6, and is a pulse having a long width (d) to the input of the switching element 126 on the drive side, indicated on 153. Furthermore, a pulse is a set pulse to the flip-flop 149 at a delayed position (f) indicated on 154, and is a pulse having a short width (h) to the input of the switching element 129 on the reflux side indicated on 156. That is, if the timing of output from the subtraction circuit 147 in the voltage-PWM conversion circuits 120, 121, and 122 is delayed, the duration for which the switching elements 126, 127, and 128 on the drive side are ON becomes wide and the duration for which the switching elements 129, 130, and 131 on the reflux side are ON becomes narrow. As a result, the current i1 of the coil 135 indicated by 157 becomes a large value of (j), for example.

By controlling the operation timings of the switching elements 126, 127, and 128 on the drive side and the switching elements 129, 130, and 131 on the reflux side in this manner, the sum of the currents i1, i2, and i3 flowing through the plurality of coils 135, 136, and 137 can be controlled to be a target value.

Incidentally, the applied voltage of the semiconductor laser diode serving as a load has a property of gradually increasing from about 1.8 V to about 2.1 V as the applied current of the semiconductor laser diode increases. Therefore, it is desirable that the primary power supply voltage of the switching power supply in FIG. 4 changes from (3/2)× 1.8 V=2.7 V to (3/2)×2.1 V=3.15 V as the current applied to the semiconductor laser diode increases. However, since this change amount is small, the primary power supply voltage can be set to (3/2)×1.95 V=2.925 V with the output voltage set to 1.95V which is the average value of applied voltages of the semiconductor laser diodes. In addition, when a target current applied to the semiconductor laser diode 139 is changed, the current flowing through the semiconductor laser diode 139 is controlled to be kept as the target laser current, and thus the increase time is shorter and the decrease time is longer than Table 1 when the target laser current is small and the increase time is longer and the decrease time is shorter than Table 1 when the target laser current is large. Therefore, the sum of the currents flowing through the plurality of coils is not constant and some ripples are generated. However, the influence of a differential between the increase time in Table 1 and the controlled increase time is small, and ripples can maintain a value of about 1%, and thus there is no problem in driving the semiconductor laser diode. When the number of phases is 6 or more, the ripples can be further reduced to 0.1% or less.

In order to determine primary power supply voltages of various specific switching power supplies using Table 1, the average value of applied voltages of the semiconductor laser diode can be adopted as the output voltage VO as described above, but there is no problem even if an arbitrary value between the minimum value and the maximum value of the applied voltages of the semiconductor laser diode is adopted as the output voltage VO.

Hereinafter, a switching power supply or a laser device of a third embodiment of the present invention will be described with reference to FIGS. 7 to 10.

The switching power supply of the third embodiment includes a primary power supply, a plurality of switching elements connected to the primary power supply, a plurality of coils connected to the plurality of switching elements, and one capacitor connected to the plurality of coils, and has a structure in which a sum of currents flowing through the plurality of coils is made constant, that is, an amount of ripples is reduced, and the current is controlled by a means for setting or selecting a power supply voltage, that is, a primary power supply voltage, and a means for changing the power supply voltage.

Figure 7:
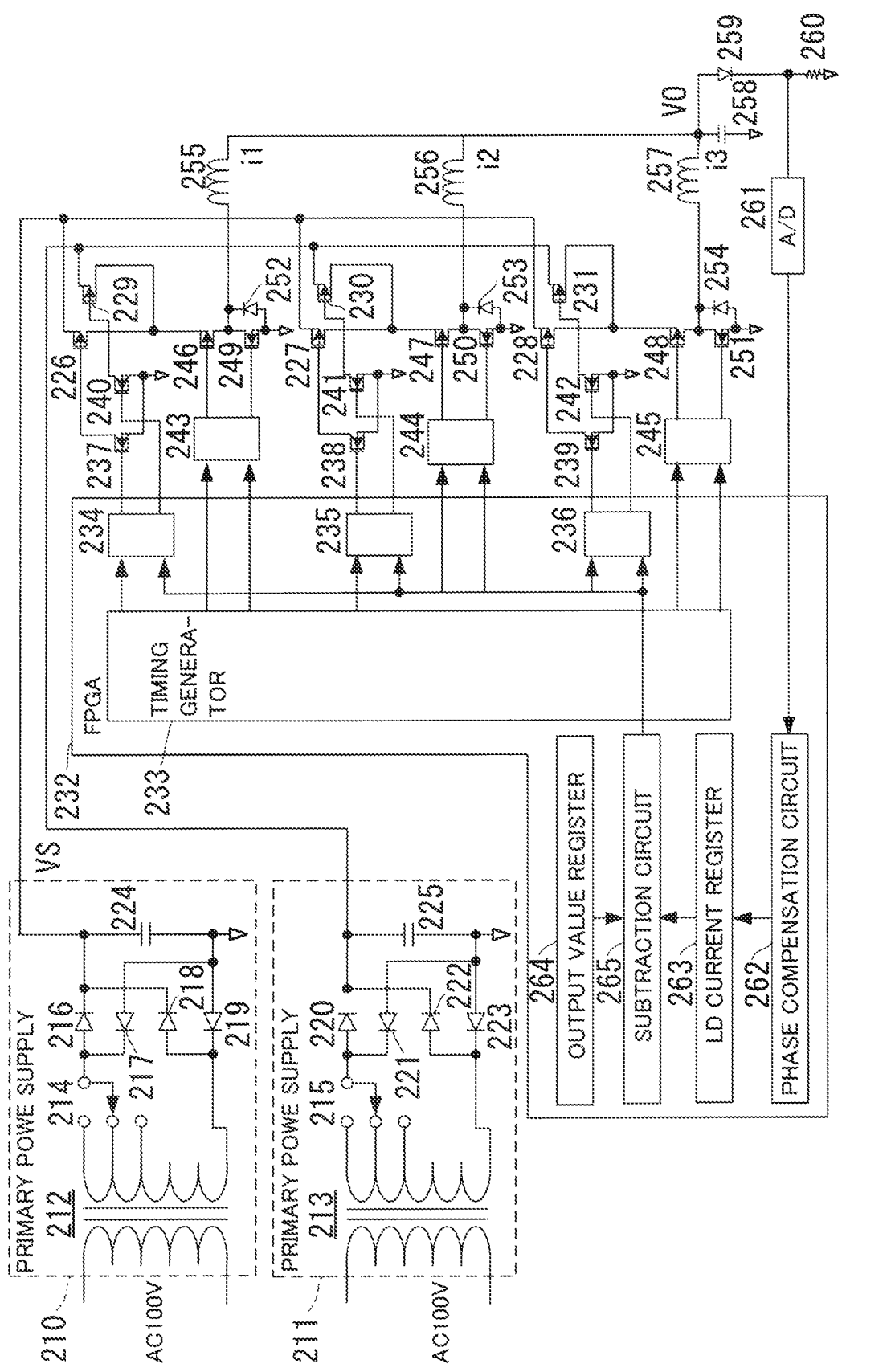
FIG. 7 is a diagram illustrating a circuit of a switching power supply or a laser device in a third embodiment of the present invention.

First, a configuration of the switching power supply of the third embodiment will be described with reference to FIG. 7. In FIG. 7, reference numerals 210 and 211 denote primary power supplies. As components of the primary power supply 210 and the primary power supply 211, power transformers 212 and 213 have a structure in which a plurality of taps are drawn out on the secondary side and an output voltage on the secondary side can be selected. As will be described later, switches 214 and 215 select a plurality of taps provided on the secondary sides of the power transformers 212 and 213 such that a power supply voltage to be applied to the switching power supply or the main body of the switching power supply can be set or selected. Rectifier diodes 216, 217, 218, 219, 220, 221, 222, and 223 perform bridge rectification. Capacitors 224 and 225 convert pulsating current obtained by the rectifier diodes 216, 217, 218, 219, 220, 221, 222, and 223 into direct current to obtain a primary power supply voltage applied to the switching power supply or the main body of the switching power supply. The taps of the power transformer 213 of the primary power supply 211 include taps having a higher voltage than the taps of the power transformer 212 of the primary power supply 210, and the primary power supply 211 supplies a higher primary power supply voltage than the primary power supply 210. P-channel FETs 226, 227, and 228 are connected to the primary power supply 210. P-channel FETs 229, 230, and 231 are connected to the primary power supply 211. Normally, that is, when current target value control or feedback control is not performed, the voltage of the primary power supply 210 can be applied to the switching power supply.

A field programmable gate array (FPGA) 232 has a function of performing overall control. A timing generator 233 has a function of generating timing pulses having different phases at a cycle of approximately 1 us to 3 μs. Second voltage-pulse width modulation (PWM) conversion circuits 234, 235, and 236 have a function of converting a differential voltage value of an output into a pulse duration. N-channel FETs 237, 238, and 239 receive outputs of the second voltage-PWM conversion circuits 234, 235, and 236 to drive the FETs 226, 227, and 228. N-channel FETs 240, 241, and 242 receive the outputs of the second voltage-PWM conversion circuits 234, 235, and 236 to drive the FETs 229, 230, and 231.

Level conversion circuits 243, 244, and 245 convert timing pulses provided from timing generator 233 into pulses for driving the switching elements. Switching elements 246, 247, and 248 on the drive side use P-channel FETs and have source terminals connected to the primary power supply voltages 210 and 211 through the FETs 226, 227, and 228 or the FETs 229, 230, and 231. Switching elements 249, 250, and 251 on the reflux side use N-channel FETs and have drain terminals connected to drain terminals of the switching elements 246, 247, and 248 on the drive side. Diodes 252, 253, and 254 on the reflux side realize high-speed current switching using Schottky diodes and are connected in parallel to the switching elements 249, 250, and 251 on the reflux side. Coils 255, 256, and 257 having cores on which a plurality of windings are applied have an appropriate identical inductance value and serve to change currents flowing from the drain terminals of the switching elements 246, 247, and 248 on the drive side or the drain terminals of the switching elements 249, 250, and 251 on the reflux side with a gentle gradient. A capacitor 258 serves to maintain a constant voltage by receiving currents flowing from the coils 255, 256, and 257. A semiconductor laser diode 259 serving as a load is connected in series to the coils 255, 256, and 257 and connected in parallel to the capacitor 258, and has a property of gradually increasing from a both-end voltage of about 1.8 V to about 2.1 V with respect to a current applied as the current increases similarly to a normal diode. A current detection resistor 260 measures a current flowing through the semiconductor laser diode 259, and a resistance capable of flowing a large current of about several 10 mΩ is used as the current detection resistor. In order to obtain higher optical power, a plurality of semiconductor laser diodes may be connected in series, and in that case, a higher applied voltage is required depending on the number of connections. The switching element 246 on the drive side and the switching element 249 on the reflux side constitute one set or one phase of switching elements, the switching element 247 on the drive side and the switching element 250 on the reflux side constitute one set or one phase of switching elements, and the switching element 248 on the drive side and the switching element 251 on the reflux side constitute one set or one phase of switching elements.

An A/D converter 261 converts the voltage across the current detection resistor 260 into a numerical value and quantifies the current flowing through the semiconductor laser diode 259. A phase compensation circuit 262 including a digital filter serves to perform phase compensation such that a control loop does not oscillate even when the value of the current flowing through the semiconductor laser diode 259 is strongly controlled. A laser current register 263 holds the output of the phase compensation circuit 262. An output value register 264 holds a target current value flowing through the semiconductor laser diode 259. A subtraction circuit 265 compares the value of the laser current register 263 with the value of the output value register 264, and outputs a differential voltage value between a target current value flowing through the semiconductor laser diode 259 and an actual current value flowing through the semiconductor laser diode 259.

Next, a configuration of a second voltage-PWM conversion circuit with respect to the switching power supply of the third embodiment will be described with reference to FIG. 8.

Figure 8:
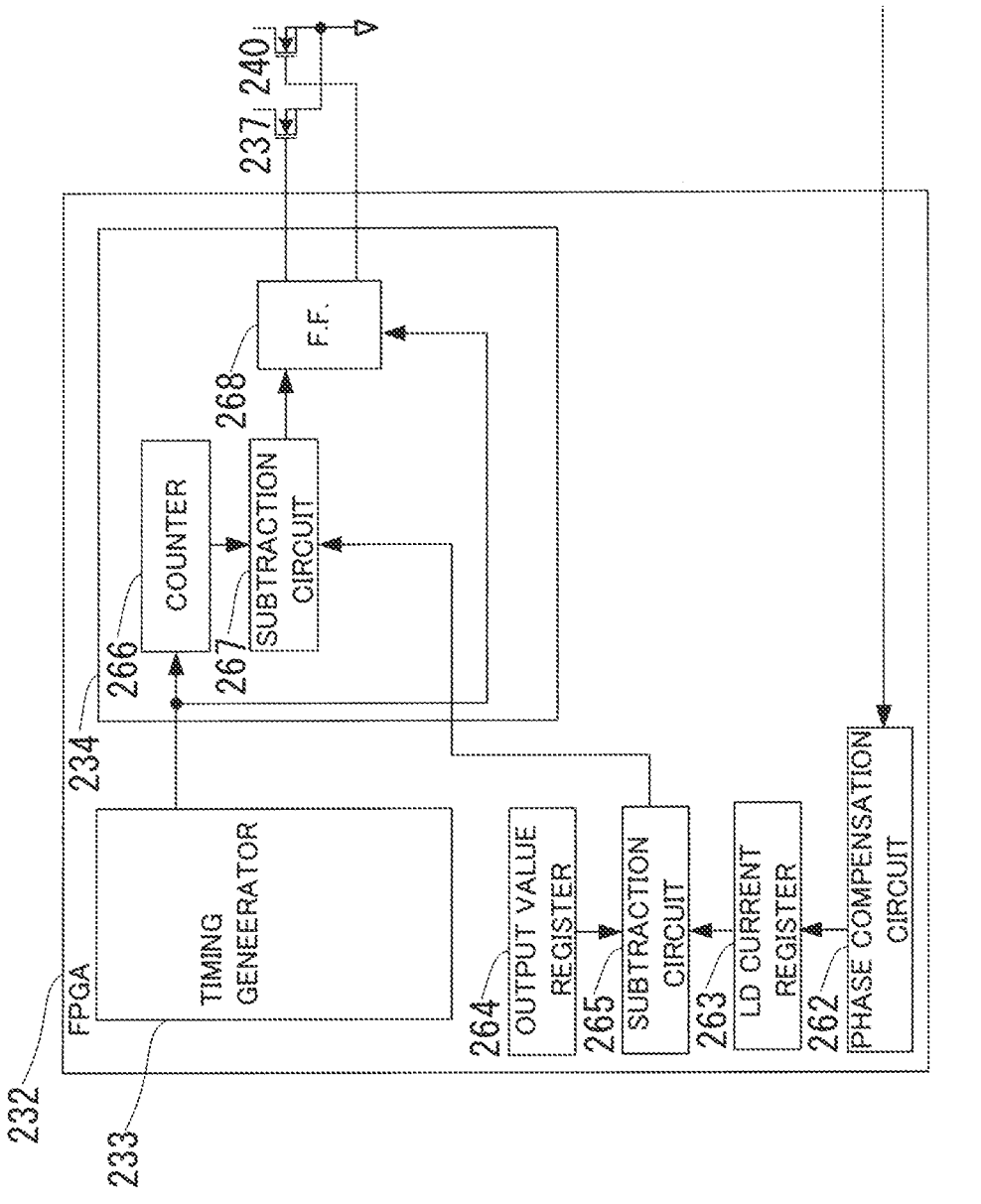
FIG. 8 is a diagram illustrating one second voltage-PWM conversion circuit in the third embodiment of the present invention.

In FIG. 8, the FPGA 232, the timing generator 233, the phase compensation circuit 262, the laser current register 263, the output value register 264, the subtraction circuit 265, and the FETs 237 and 240 are illustrated in FIG. 7. FIG. 8 illustrates a configuration of the second voltage-PWM conversion circuit 234. Although the second voltage-PWM conversion circuits 235 and 236 are not illustrated, the second voltage-PWM conversion circuits 235 and 236 have a configuration similar or identical to that of the second voltage-PWM conversion circuit 234.

The second voltage-PWM conversion circuits 234, 235, and 236 have a function of converting a differential voltage value of an output into a pulse duration. As components of the second voltage-PWM conversion circuits 234, 235, and 236, a counter 266 receives a reference pulse from the timing generator 233 and outputs a numerical value that increases with time to generate driving and reflux timings. A subtraction circuit 267 compares the output provided from the counter 266 with a differential voltage value that is the output of the subtraction circuit 265 by subtraction, and outputs a pulse when the output and the differential voltage value become equal.

A flip-flop (F.F.) 268 provides a voltage change timing and has a function of receiving a reference pulse from the timing generator 233 and pulses of the subtraction circuit 267, generating a pulse having a short width, and outputting the pulse to the FETs 237, 238, and 239, generating a pulse having a long width, and outputting the pulse to the FETs 240, 241, and 242 if the differential voltage value is small, and if the differential voltage value is large, generating a pulse having a long width, and outputting the pulse to the FETs 237, 238, and 239, generating a pulse having a short width, and outputting the pulse to the FETs 240, 241, and 242. The output of the flip-flop 268 includes an output to the FETs 237, 238, and 239 and an output to the FETs 240, 241, and 242, and these outputs have logic opposite to each other.

An operation of the switching power supply that controls the sum of the currents flowing through the plurality of coils to be a target value will be described with reference to FIG. 9 as a first application example of the switching power supply of the third embodiment that changes a rate of increase of the currents flowing through the coils by a means for setting or selecting the power supply voltage and changing the power supply voltage.

Figure 9:
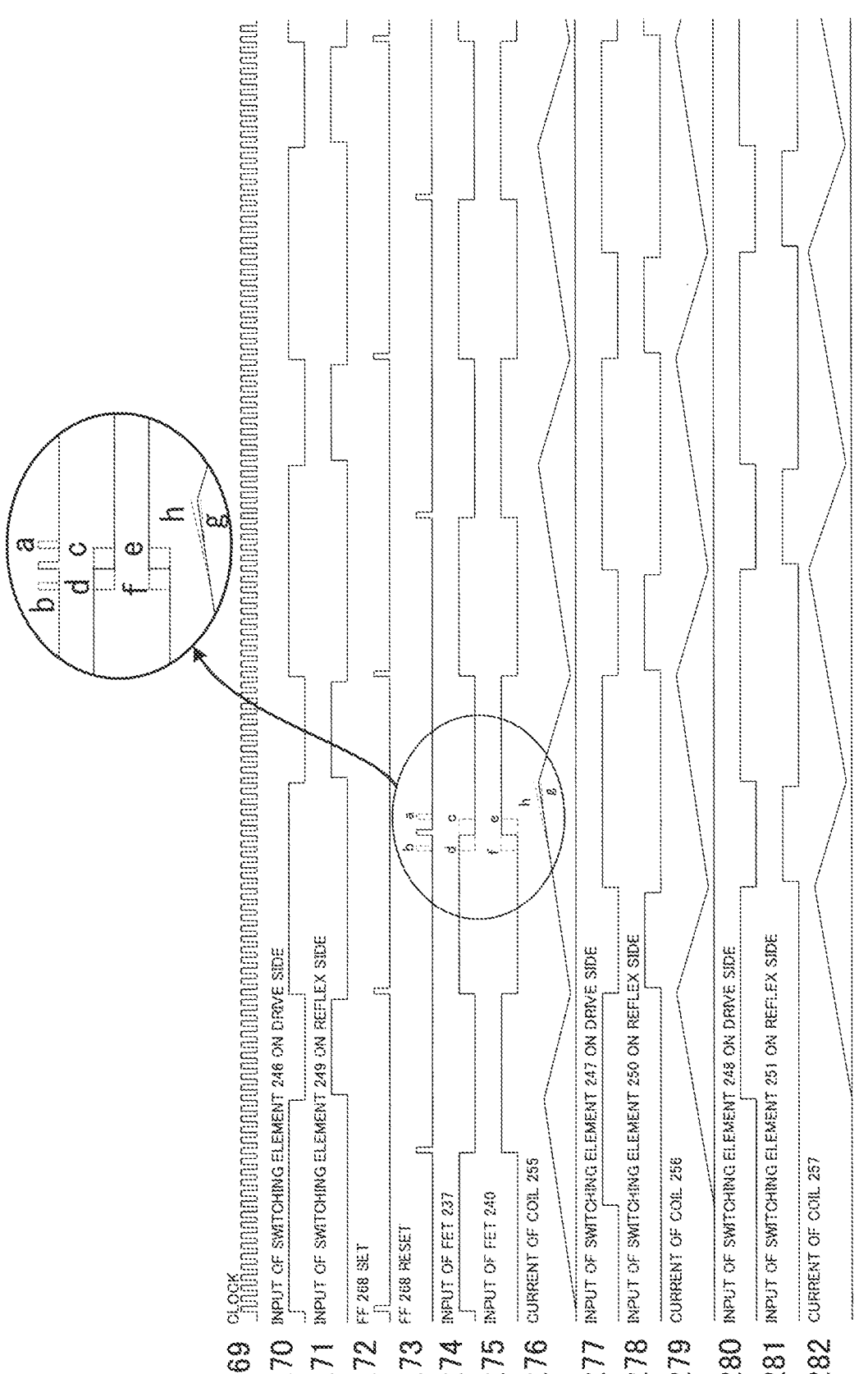
FIG. 9 is a diagram illustrating operation timing of the switching power supply in the third embodiment of the present invention.

In FIG. 9, reference numeral 269 denotes a clock signal that has a cycle of about 10 ns to 100 ns output from timing generator 233 and serves as a foundation of operation of the switching power supply. Reference numeral 270 denotes a signal output from timing generator 233 at a constant timing, and when this signal is ON, the switching element 246 on the drive side is driven through the level conversion circuit 243. Reference numeral 271 denotes a signal output from timing generator 233 at a constant timing, and when this signal is ON, the switching element 249 on the reflux side is driven through the level conversion circuit 243. Here, the operation of the second voltage-PWM conversion circuit 234 in FIG. 8 will be described. In FIG. 9, reference numeral 272 denotes a timing at which the counter 266 in FIG. 8 is reset and the flip-flop 268 is set, and in the present embodiment, pulses are regularly provided every 3 us from the timing generator 233. Reference numeral 273 denotes a reset timing of the flip-flop 268, and the generation position varies due to a pulse output from the subtraction circuit 267. Reference numeral 274 denotes an input of the FET 237 in response to the output of the flip-flop 268, in which ON and OFF are repeated at the set timing and the reset timing of the flip-flop 268, and when this output is ON, the FET 226 is ON via the FET 237. Reference numeral 275 denotes an input of the FET 240 in response to the output of the flip-flop 268, in which ON and OFF of the reverse logic to the input of the FET 237 denoted by 274 are repeated at the set timing and the reset timing of the flip-flop 268, and when this output is ON, the FET 229 is ON via the FET 240.

Reference numeral 276 represents change in a current i1 of the coil 255, and the current repeatedly increases and decreases by the operations of the switching element 246 on the drive side and the switching element 249 on the reflux side. When the switching element 246 on the drive side is ON, the switching element 249 on the reflux side is OFF, and when the switching element 246 on the drive side is OFF, the switching element 249 on the reflux side is ON. At this time, when the switching element 246 on the drive side and the switching element 249 on the reflux side are simultaneously ON, a through current is generated in the switching element 246 on the drive side and the switching element 249 on the reflux side, and thus it is desirable that the timing 270 rise later than falling of the timing 271 and fall earlier than rising of the timing 271.

Reference numeral 277 denotes a signal output from timing generator 233 at a constant timing, and when this signal is ON, the switching element 247 on the drive side is driven through the level conversion circuit 244. Reference numeral 278 denotes a signal output from timing generator 233 at a constant timing, and when this signal is ON, the switching element 250 on the reflux side is driven through the level conversion circuit 244. The timing 277 and the timing 278 are operated later than the timing 270 and the timing 271 by ⅓ cycle (phase of 2π/3).

The second voltage-PWM conversion circuit 235 in FIG. 7 receive the output of the timing generator 233 and a differential voltage value corresponding to the output of the subtraction circuit 265, compares the output provided from the counter 266 and the differential voltage value of the subtraction circuit 265 by subtraction in the subtraction circuit 267, and outputs a pulse when the output and the differential voltage value become equal. The set/reset timing of the flip-flop 268 of the second voltage-PWM conversion circuit 235 is basically delayed by ⅓ cycle from the set/reset timing of the flip-flop 268 of the voltage-PWM conversion circuit 234, and operation timings of the FET 238 and the FET 241 are delayed by ⅓ cycle from the operation timings of the FET 237 and the FET 240. In addition, the reset timing of flip-flop 268 of the second voltage-PWM conversion circuit 235 is not illustrated although the generation position varies due to the pulse output from the subtraction circuit 267. Reference numeral 279 represents change in a current i2 of the coil 256, and the current repeatedly increases and decreases by the operations of the switching element 247 on the drive side and the switching element 250 on the reflux side.

Reference numeral 280 denotes a signal output from timing generator 233 at a constant timing, and when this signal is ON, the switching element 248 on the drive side is driven through the level conversion circuit 245. Reference numeral 281 denotes a signal output from timing generator 233 at a constant timing, and when this signal is ON, the switching element 251 on the reflux side is driven through the level conversion circuit 245. The timing 280 and the timing 281 are operated later than the timing 270 and the timing 271 by ⅔ cycle (phase of 4π/3).

The second voltage-PWM conversion circuit 236 in FIG. 7 receives the output of the timing generator 233 and a differential voltage value corresponding to the output of the subtraction circuit 265, compares the output provided from the counter 266 and the differential voltage value of the subtraction circuit 265 by subtraction in the subtraction circuit 267, and outputs a pulse when the output and the differential voltage value become equal. The set/reset timing of the flip-flop 268 of the second voltage-PWM conversion circuit 236 is basically delayed by ⅔ cycle from the set/reset timing of the flip-flop 268 of the voltage-PWM conversion circuit 234, and operation timings of the FET 239 and the FET 242 are delayed by ⅔ cycle from the operation timings of the FET 237 and the FET 240. In addition, the reset timing of flip-flop 268 of the second voltage-PWM conversion circuit 236 is not illustrated although the generation position varies due to the pulse output from the subtraction circuit 267. Reference numeral 282 represents change in a current i3 of the coil 257, and the current repeatedly increases and decreases by the operations of the switching element 248 on the drive side and the switching element 251 on the reflux side.

In the configuration of FIG. 7, the number of phases is three, and the currents i1, i2, and i3 flowing through the coils 255, 256, and 257 have the same waveform in which the former ⅔ increases or rises and the latter ⅓ decreases or falls, basically, that is, if target value control or feedback control of the currents is not performed, and the phases thereof are shifted by 2π/3 (coil currents 276, 279, and 282 in FIG. 9), and thus the number of phases, 3, NON2, and NOFF1 are selected from Table 1 showing a power supply voltage, increase time, and decrease time depending on the number of coils, and the voltage of the primary power supply 210 is set to (3/2)×output voltage VO (voltage drop by the current detection resistor 260 is negligibly small). When the circuits illustrated in FIGS. 7 and 8 are operated at the timings of FIG. 9, the currents from the switching elements 246, 247, and 248 on the drive side and the switching elements 249, 250, and 251 on the reflux side flow to the coils 255, 256, and 257, and the capacitor 258 receives the currents i1, i2, and i3 flowing from the coils 255, 256, and 257 to maintain a constant voltage, and can flow a current without ripples into the semiconductor laser diode 259.

On the other hand, a function of controlling this current to be a target value is required. In order to realize this function, the laser current register 263 is provided through the current detection resistor 260, the A/D converter 261, and the phase compensation circuit 262, and the laser current register 263 is set to a value proportional to the current flowing through the semiconductor laser diode 259. The value of the laser current register 263 is compared with a target laser current preset in the output value register 264 by the subtraction circuit 265 to generate a differential voltage value.

When the actual current value flowing through the semiconductor laser diode 259 is greater than the target current value, a large value is held in the laser current register 263 and compared with the value of the output value register 264 by the subtraction circuit 265 to output a large differential voltage value. The output provided from the counter 266 in each of the second voltage-PWM conversion circuits 234, 235, and 236 and the differential voltage value of the subtraction circuit 265 are compared through subtraction in the subtraction circuit 267, and a pulse is output when they become equal. Specifically, in the second voltage-PWM conversion circuit 234, the pulse is a reset pulse to the flip-flop 268 at a delayed position (a) indicated on 273 of FIG. 9, and is a pulse having a long width (c) indicated on 274, which is input to the FET 237. Reference numeral 275 denotes an inverse logic of 274, and an input pulse to the FET 240 has a short width (c). That is, if the timing output from the subtraction circuit 267 is delayed in the second voltage-PWM conversion circuits 234, 235, and 236, a low primary voltage at which the FETs 226, 227, and 228 are ON via the FETs 237, 238, and 239 is applied to the coils 255, 256, and 257 for a long time through the driving switching elements 246, 247, and 248, and then a high primary voltage at which the FETs 229, 230, and 231 are ON via the FETs 240, 241, and 242 is applied to the coils 255, 256, and 257 for a short time through the driving switching elements 246, 247, and 248, and the current i1 of the coil 255 becomes a small value (g) indicated on 276, for example.

When the actual current value flowing through the semiconductor laser diode 259 is less than the target current value, a small value is held in the laser current register 263 and compared with the value of the output value register 264 through the subtraction circuit 265 to output a small differential voltage value. The output provided from the counter 266 in each of the second voltage-PWM conversion circuits 234, 235, and 236 and the differential voltage value of the subtraction circuit 265 are compared through subtraction in the subtraction circuit 267, and a pulse is output when they become equal. Specifically, in the second voltage-PWM conversion circuit 234, the pulse is a reset pulse to the flip-flop 268 at an early position b indicated on 273, and is a pulse having a short width (d) indicated on 274, which is input to the FET 237. Reference numeral 275 denotes an inverse logic of 274, and an input pulse to the FET 240 has a long width (f). That is, if the timing output from the subtraction circuit 267 is early in the second voltage-PWM conversion circuits 234, 235, and 236, a low primary voltage at which the FETs 226, 227, and 228 are ON via the FETs 237, 238, and 239 is applied to the coils 255, 256, and 257 for a short time through the driving switching elements 246, 247, and 248, and then a high primary voltage at which the FETs 229, 230, and 231 are ON via the FETs 240, 241, and 242 is applied to the coils 255, 256, and 257 for a long time through the driving switching elements 246, 247, and 248, and the current i1 of the coil 255 becomes a large value h indicated on 276, for example.

That is, in FIG. 7, when the switching elements 246, 247, and 248 on the drive side are ON, where the power supply voltage of the primary power supply is VS, the laser power supply output is VO, and the value of the inductance of the coils 255, 256, and 257 is L, the currents i1, i2, and i3 flowing through the coils 255, 256, and 257 each become an increase amount iLON represented by the following formula after T seconds.

$$iLON = (VS - VO) \times T/L$$

In this formula, since the coil currents increase in proportion to the difference between the power supply voltage VS and the laser output voltage VO, the coil currents can be controlled by a means for appropriately raising and lowering VS.

When the coil currents are to be significantly or more increased, the coil currents are increased by increasing the time for applying the high primary voltage through the FETs 229, 230, and 231 with respect to the time for applying the low primary voltage through the FETs 226, 227, and 228. When the coil currents are to be slightly or less increased, increases in the coil currents are reduced by decreasing the time for applying the high primary voltage through the FETs 229, 230, and 231 with respect to the time for applying the low primary voltage through the FETs 226, 227, and 228.

That is, the sum of the currents flowing through the plurality of coils can be controlled to be a target value by a means for controlling the power supply voltage to increase when the output current is small and to decrease when the output current is large. In addition, the influence of variation in the applied voltage of the semiconductor laser diode 259 and change in the current waveform due to control of the voltage of the primary power supply is insignificant, and ripples can be maintained at a value of about 1%, and thus there is no problem in driving the semiconductor laser diode.

As a second application example of the switching power supply of the third embodiment in which a rate of increase of a current flowing through a coil is changed by a means for changing the power supply voltage, a switching power supply characterized by accelerating startup will be described below with reference to FIGS. 7 to 10.

When the laser output current of the switching power supply is to be raised more rapidly, a large value is set in the output value register 264 in FIG. 7 before startup. Next, the operation of the second voltage-PWM conversion circuit 234 will be described. The timing generator 233 is operated, the switching element 246 on the drive side is driven as indicated by 270 in FIG. 9, and further the switching element 249 on the reflux side is driven as indicated by 271. Further, the timing generator 233 is operated, and setting is performed on the counter 266 and flip-flop 268 of the second voltage-PWM conversion circuit 234 in FIG. 8 by a pulse indicated by 283 in FIG. 10 at a timing similar to 272 in FIG. 9. Subsequently, since a large value is set in the output value register 264, a reset pulse of the flip-flop 268 is generated at an early timing a as indicated by 284 of FIG. 10. Therefore, the flip-flop 268 immediately after startup inputs a short pulse to the FET 237 as indicated by b of 285, and thus the FET 226 is OFF for a long time. At the same time, as indicated by 286, a long pulse c is input to the FET 240, and thus the FET 229 is ON for a long time, and a high primary power supply voltage is applied to the driving switching element 246. Therefore, the current flowing through the coil 255 rapidly increases as indicated by d of 287, and the output current also increases.

Figure 10:
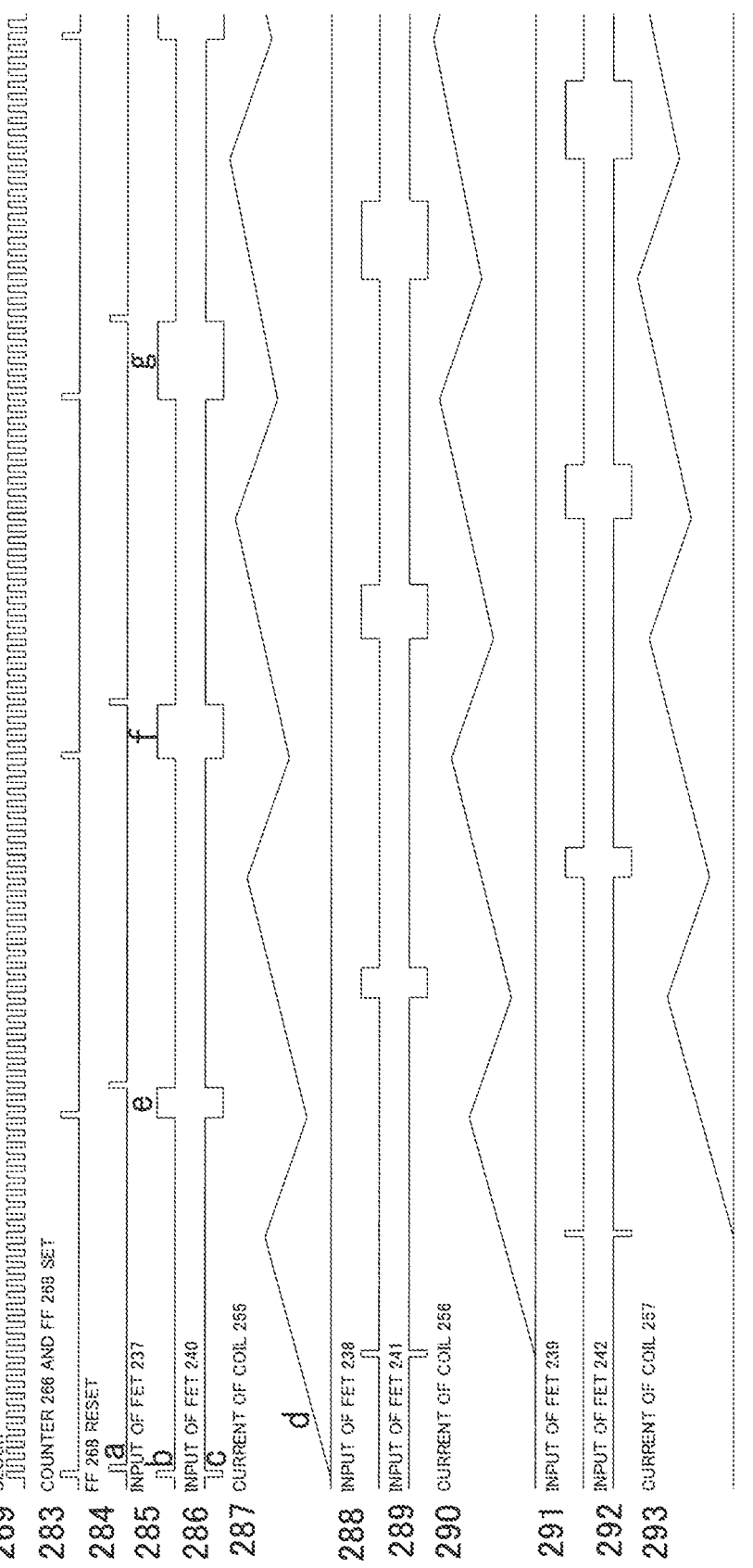
FIG. 10 is a diagram illustrating another operation timing of the switching power supply in the third embodiment of the present invention.

Further, the switching element 247 on the drive side is driven as indicated by 277 in FIG. 9, and the switching element 250 on the reflux side is further driven as indicated by 278. The second voltage-PWM conversion circuit 235 of FIG. 7 operates similarly to the second voltage-PWM conversion circuit 234, a short pulse 288 of FIG. 10 is input to the FET 238, and thus the FET 227 is OFF for a long time. At the same time, a long pulse 289 is input to the FET 241, and thus the FET 230 is ON for a long time, and a high primary power supply voltage is applied to the driving switching element 247. Therefore, the current i2 flowing through the coil 256 increases rapidly as indicated by 290, and the output current also increases. Such pulse signals 288 and 289 operate at timing delayed by ⅓ cycle from the pulse signals at the timings 285 and 286.

Further, the switching element 248 on the drive side is driven as indicated by 280 in FIG. 9, and the switching element 251 on the reflux side is further driven as indicated by 281. The second voltage-PWM conversion circuit 236 of FIG. 7 operates similarly to the second voltage-PWM conversion circuit 234, a short pulse 291 of FIG. 10 is input to the FET 239, and thus the FET 228 is OFF for a long time. At the same time, a long pulse 292 is input to the FET 242, and thus the FET 231 is ON for a long time and a high primary power supply voltage is applied to the driving switching element 248. Therefore, the current i3 flowing through the coil 257 increases rapidly as indicated by 293, and the output current also increases. Such pulse signals 291 and 292 operate at a timing delayed by ⅔ cycle from the pulse signals at the timings 285 and 286.

In this way, the currents i1, i2, and i3 of the coils 255, 256, and 257 increase rapidly. As the currents of the coils 255, 256, and 257 increase, the value of the output value register 264 is sequentially decreased from a large value, a pulse signal having sequentially increasing width, as indicated by (c), (f), and (g) of 285 of FIG. 10, is input to the FET 237 to reduce increase in the coil currents, and at the end of startup, a current value to flow to the target laser diode 259 is set. After startup is completed, continuously the rate of increase of the currents i1, i2, and i3 flowing through the coils 255, 256, and 257 is changed by a means for changing the power supply voltage, and the operation is performed such that the sum of the currents flowing through the plurality of coils 255, 256, and 257 is controlled to be a target value.

Hereinafter, a switching power supply or a laser device of a fourth embodiment of the present invention will be described with reference to FIGS. 11 to 14.

The high-speed switching power supply of the fourth embodiment includes a primary power supply, a plurality of switching elements connected to the primary power supply, a plurality of coils connected to the plurality of switching elements, and one capacitor connected to the plurality of coils, and has a structure in which a total sum of currents flowing through the plurality of coils is made constant, that is, an amount of ripples is reduced, and the total sum is controlled to be a target value by a means for setting or selecting a power supply voltage, that is, a primary power supply voltage, and a means for changing (including cases where the only way to change is to enable or short-circuit a resistor) a resistance value inserted into or connected to the switching elements.

First, a configuration of the switching power supply of the fourth embodiment will be described with reference to FIG. 11.

Figure 11:
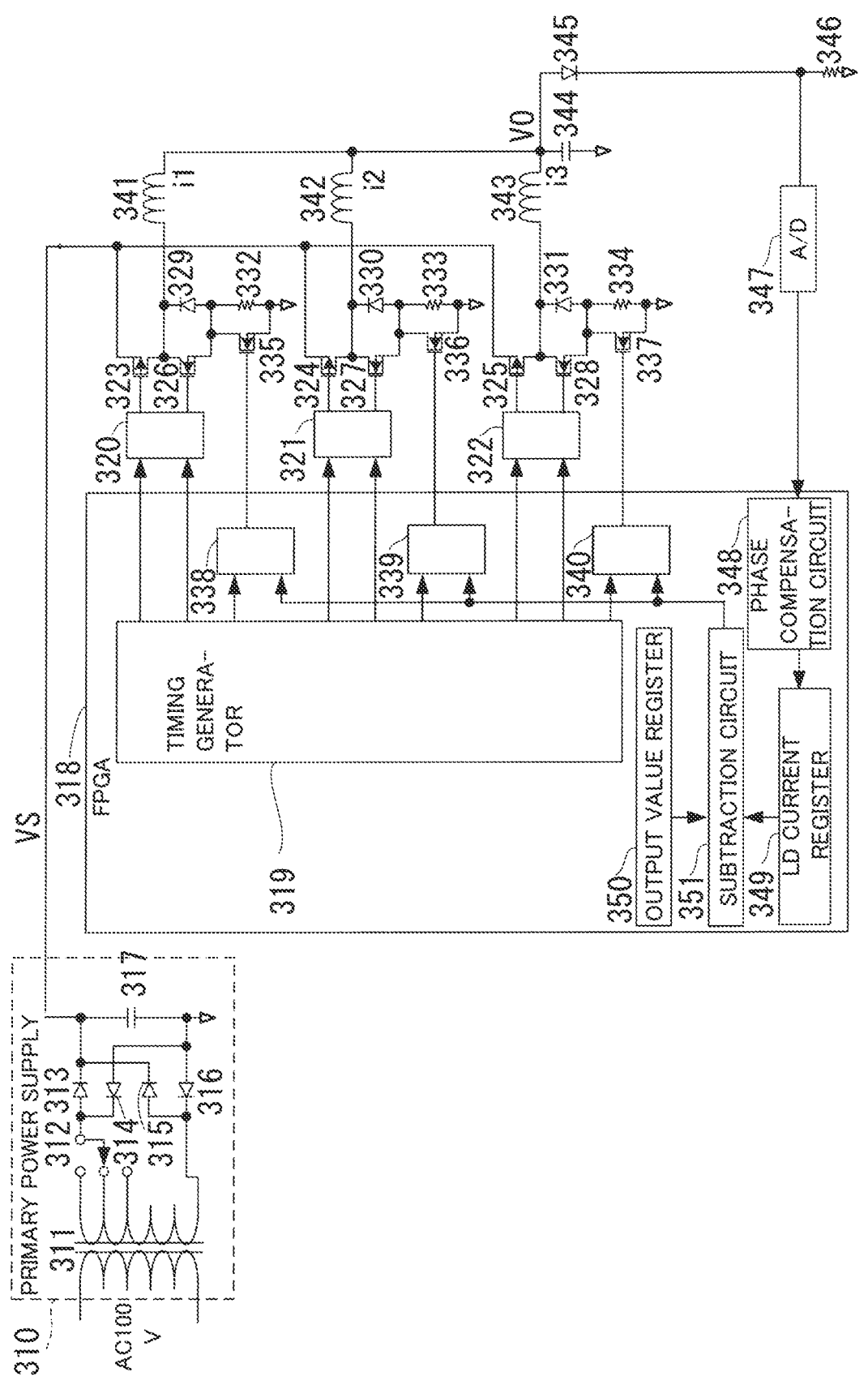
FIG. 11 is a diagram illustrating a circuit of a switching power supply or a laser device in a fourth embodiment of the present invention.

In FIG. 11, reference numeral 310 denotes a primary power supply. As components of the primary power supply 310, a power transformer 311 has a structure in which a plurality of taps are drawn out on the secondary side and an output voltage on the secondary side can be selected. A switch 312 enables setting or selection of a power supply voltage to be applied to the switching power supply or the main body of the switching power supply by selecting the plurality of taps provided on the secondary side of the power transformer 311 as will be described later. Rectifier diodes 313, 314, 315, and 316 perform bridge rectification. A capacitor 317 converts the pulsating current obtained by the rectifier diodes 313, 314, 315, and 316 into a direct current to obtain a primary power supply voltage applied to the switching power supply or the main body of the switching power supply.

A field programmable gate array (FPGA) 318 has a function of performing overall control. A timing generator 319 has a function of generating timing pulses having different phases at a cycle of approximately 1 μs to 3 μs. Level conversion circuits 320, 321, and 322 convert timing pulses provided from timing generator 319 into pulses for driving the switching elements. Switching elements 323, 324, and 325 on the drive side use P-channel FETs and have source terminals connected to the primary power supply voltage. Switching elements 326, 327, and 328 on the reflux side use N-channel FETs and have drain terminals connected to drain terminals of the switching elements 323, 324, and 325 on the drive side. Diodes 329, 330, and 331 on the reflux side realize high-speed current switching using Schottky diodes and are connected in parallel to the switching elements 326, 327, and 328 on the reflux side. Attenuation resistors 332, 333, and 334 are inserted in series in the switching elements 326, 327, and 328 on the reflux side and the diodes 329, 330, and 331 on the reflux side. N-channel FETs 335, 336, and 337 are connected in parallel to the attenuation resistors 332, 333, and 334. The switching element 323 on the drive side and the switching element 326 on the reflux side constitute one set or one phase of switching elements, the switching element 324 on the drive side and the switching element 327 on the reflux side constitute one set or one phase of switching elements, and the switching element 325 on the drive side and the switching element 328 on the reflux side constitute one set or one phase of switching elements.

Third voltage-pulse width modulation (PWM) conversion circuits 338, 339, and 340 have a function of converting a differential voltage value of an output into a pulse duration. Normally, voltages are applied from the third voltage-PWM conversion circuits 338, 339, and 340 to the gate of the FET 335, the gate of the FET 336, and the gate of the FET 337, and thus the FET 335, the FET 336, and the FET 337 are ON and the attenuation resistors 332, 333, and 334 are short-circuited.

Coils 341, 342, and 343 having cores on which a plurality of windings are applied have an appropriate identical inductance value and serve to change currents flowing from the drain terminals of the switching elements 323, 324, and 325 on the drive side or the drain terminals of the switching elements 326, 327, and 328 on the reflux side with a gentle gradient. A capacitor 344 serves to maintain a constant voltage by receiving currents flowing from the coils 341, 342, and 343. A semiconductor laser diode 345 serving as a load is connected in series to the coils 341, 342, and 343 and connected in parallel to the capacitor 344, and has a property of gradually increasing from a both-end voltage of about 1.8 V to about 2.1 V with respect to a current applied as the current increases similarly to a normal diode. A current detection resistor 346 measures a current flowing through the semiconductor laser diode 345, and a resistor capable of flowing a large current of about several 10 mΩ is used as the current detection resistor. In order to obtain higher optical power, a plurality of semiconductor laser diodes may be connected in series, and in that case, a higher applied voltage is required depending on the number of connections.

An A/D converter 347 converts the voltage across the current detection resistor 346 into a numerical value and quantifies the current flowing through the semiconductor laser diode 345. A phase compensation circuit 348 including a digital filter serves to perform phase compensation such that a control loop does not oscillate even when the value of the current flowing through the semiconductor laser diode 345 is strongly controlled. A laser current register 349 holds the output of the phase compensation circuit 348. An output value register 350 holds a target current value flowing through the semiconductor laser diode 345. A subtraction circuit 351 compares the value of the laser current register 349 with the value of the output value register 350, and outputs a differential voltage value between a target current value flowing through the semiconductor laser diode 345 and an actual current value flowing through the semiconductor laser diode 345.

Next, a configuration of the third voltage-PWM conversion circuit with respect to the switching power supply of the fourth embodiment will be described with reference to FIG. 12.

Figure 12:
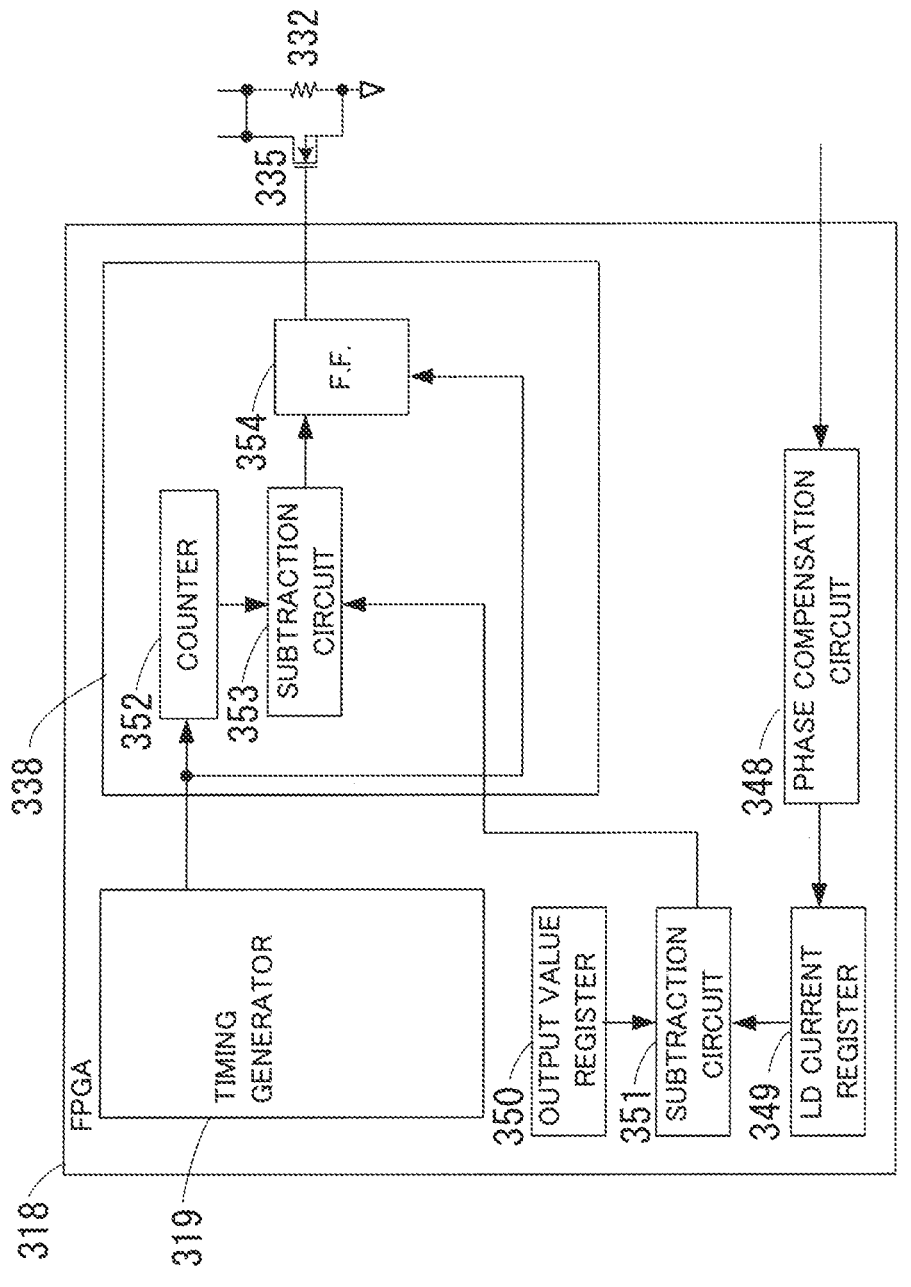
FIG. 12 is a diagram illustrating one third voltage-PWM conversion circuit in the fourth embodiment of the present invention.

In FIG. 12, the FPGA 318, the timing generator 319, the phase compensation circuit 348, the laser current register 349, the output value register 350, the subtraction circuit 351, the FET 335, and the attenuation resistor 332 are illustrated in FIG. 11. FIG. 12 illustrates a configuration of the voltage-PWM conversion circuit 338. Although the voltage-PWM conversion circuits 339 and 340 are not illustrated, the voltage-PWM conversion circuits 339 and 340 have a configuration similar or identical to that of the voltage-PWM conversion circuit 338.

The third voltage-PWM conversion circuits 338, 339, and 340 have a function of converting a differential voltage value of an output into a pulse duration. As components of the third voltage-PWM conversion circuits 338, 339, and 340, a counter 352 receives a reference pulse from the timing generator 319, and outputs a numerical value that increases with time to generate a timing of attenuation resistance control. A subtraction circuit 353 compares the output provided from the counter 352 with a differential voltage value that is the output of the subtraction circuit 351 by subtraction, and outputs a pulse when the output and the differential voltage value become equal. A flip-flop (F.F.) 354 provides a timing of attenuation resistance control and has a function of receiving the reference pulse from the timing generator 319 and pulses from the subtraction circuit 353, generating a pulse having a short width if the difference voltage value is small, and generating a pulse having a long width if the difference voltage value is large. This output is applied to the gates of the FETs 335, 336, and 337 to change the resistance values of the attenuation resistors 332, 333, and 334 to an effective value or a value for short-circuiting.

An operation of the switching power supply that controls the sum of the currents flowing through the plurality of coils to be a target value will be described with reference to FIG. 13 as a first application example of the switching power supply of the fourth embodiment that changes a rate of decrease of the currents flowing through the coil by a means for setting or selecting the power supply voltage and changing a resistance value inserted into a reflux circuit.

Figure 13:
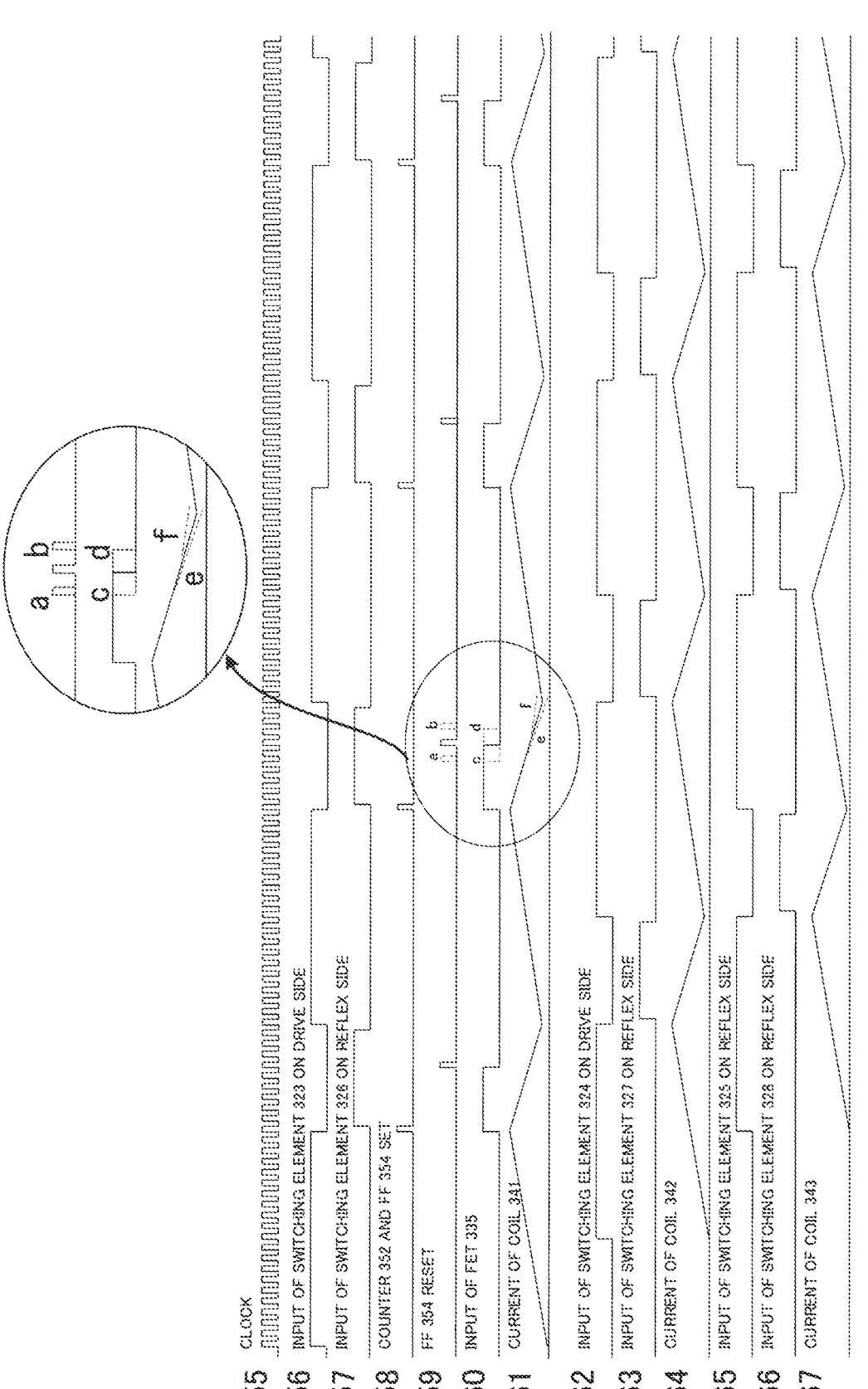
FIG. 13 is a diagram illustrating operation timing of the switching power supply in the fourth embodiment of the present invention.

In FIG. 13, reference numeral 355 denotes a clock signal having a cycle of about 10 ns to 100 ns output from the timing generator 319, and serves as a foundation of operation of the switching power supply. Reference numeral 356 denotes a signal output from timing generator 319 at a constant timing, and when this signal is ON, the switching element 323 on the drive side is driven through the level conversion circuit 320. Reference numeral 357 denotes a signal output from timing generator 319 at a constant timing, and when this signal is ON, the switching element 326 on the reflux side is driven through the level conversion circuit 320. Here, the operation of the third voltage-PWM conversion circuit 338 in FIG. 12 will be described. In FIG. 13, reference numeral 358 denotes a timing at which the counter 352 in FIG. 12 is reset and the flip-flop 354 is set, and in the present embodiment, pulses are regularly provided every 3 μs from the timing generator 319. Reference numeral 359 denotes a reset timing of the flip-flop 354, and the generation position varies due to a pulse output from the subtraction circuit 353. Reference numeral 360 denotes an input of the FET 335 in response to the output of the flip-flop 354, in which ON and OFF are repeated at the set timing and the reset timing of the flip-flop 354, and when this output is ON, the attenuation resistor 332 is short-circuited via the FET 335.

Reference numeral 361 represents change in a current i1 of the coil 341, and the current repeatedly increases and decreases by the operations of the switching element 323 on the drive side and the switching element 326 on the reflux side. When the switching element 323 on the drive side is ON, the switching element 326 on the reflux side is OFF, and when the switching element 323 on the drive side is OFF, the switching element 326 on the reflux side is ON. At this time, when the switching element 323 on the drive side and the switching element 326 on the reflux side are simultaneously ON, a through current is generated in the switching element 323 on the drive side and the switching element 326 on the reflux side, and thus it is desirable that the timing 356 rise later than falling of the timing 357 and fall earlier than rising of the timing 357.

Reference numeral 362 denotes a signal output from timing generator 319 at a constant timing, and when this signal is ON, the switching element 324 on the drive side is driven through the level conversion circuit 321. Reference numeral 363 denotes a signal output from timing generator 319 at a constant timing, and when this signal is ON, the switching element 327 on the reflux side is driven through the level conversion circuit 321. The timing 362 and the timing 363 are operated later than the timing 356 and the timing 357 by ⅓ cycle (phase is 2π/3).

The third voltage-PWM conversion circuit 339 in FIG. 11 receives the output of the timing generator 319 and a differential voltage value corresponding to the output of the subtraction circuit 351, compares the output provided from the counter 352 and the differential voltage value of the subtraction circuit 351 by subtraction in the subtraction circuit 353, and outputs a pulse when the output and the differential voltage value become equal. The set/reset timing of the flip-flop 354 of the third voltage-PWM conversion circuit 339 is basically delayed by ⅓ cycle from the set/reset timing of the flip-flop 354 of the voltage-PWM conversion circuit 338, and the operation timing of the FET 336 is delayed by ⅓ cycle from the operation timing of the FET 335. In addition, the reset timing of flip-flop 354 of the third voltage-PWM conversion circuit 339 is not illustrated although the generation position varies due to the pulse output from the subtraction circuit 353. Reference numeral 364 represents change in a current i2 of the coil 342, and the current repeatedly increases and decreases by the operations of the switching element 324 on the drive side and the switching element 327 on the reflux side.

Reference numeral 365 denotes a signal output from timing generator 319 at a constant timing, and when this signal is ON, the switching element 325 on the drive side is driven through the level conversion circuit 322. Reference numeral 366 denotes a signal output from timing generator 319 at a constant timing, and when this signal is ON, the switching element 328 on the reflux side is driven through the level conversion circuit 322. The timing 365 and the timing 366 are operated later than the timing 356 and the timing 357 by ⅔ cycle (phase is 4π/3).

The third voltage-PWM conversion circuit 340 in FIG. 11 receives the output of the timing generator 319 and a differential voltage value corresponding to the output of the subtraction circuit 351, compares the output provided from the counter 352 and the differential voltage value of the subtraction circuit 351 by subtraction in the subtraction circuit 353, and outputs a pulse when the output and the differential voltage value become equal. The set/reset timing of the flip-flop 354 of the third voltage-PWM conversion circuit 340 is basically delayed by ⅔ cycle from the set/reset timing of the flip-flop 354 of the voltage-PWM conversion circuit 338, and the operation timing of the FET 337 is delayed by ⅔ cycle from the operation timing of the FET 335. In addition, the reset timing of flip-flop 354 of the third voltage-PWM conversion circuit 340 is not illustrated although the generation position varies due to the pulse output from the subtraction circuit 353. Reference numeral 367 represents change in a current i3 of the coil 343, and the current repeatedly increases and decreases by the operations of the switching element 325 on the drive side and the switching element 328 on the reflux side.

In the configuration of FIG. 11, the number of phases is three, and the currents i1, i2, and i3 flowing through the coils 341, 342, and 343 have the same waveform in which the former ⅔ increases or rises and the latter ⅓ decreases or falls, and the phases thereof are shifted by 2π/3 (coil currents 361, 364, and 367 in FIG. 13), basically, that is, if target value control or feedback control of the currents is not performed, and thus the number of phases 3, NON2, and NOFF1 are selected from Table 1 showing a power supply voltage, increase time, and decrease time depending on the number of coils, and the voltage of the primary power supply 310 is set to (3/2)×output voltage VO (voltage drop by the current detection resistor 346 is negligibly small).

When the circuits illustrated in FIGS. 11 and 12 are operated at the timings of FIG. 13, the currents from the switching elements 323, 324, and 325 on the drive side and the switching elements 326, 327, and 328 on the reflux side flow to the coils 341, 342, and 343, and the capacitor 344 receives the currents i1, i2, and i3 flowing from the coils 341, 342, and 343 to maintain a constant voltage, and can flow a current without ripples into the semiconductor laser diode 345.

On the other hand, a function of controlling this current to be a target value is required. In order to realize this function, the laser current register 349 is provided through the current detection resistor 346, the A/D converter 347, and the phase compensation circuit 348, and the laser current register 349 is set to a value proportional to the current flowing through the laser diode 345. The value of the laser current register 349 is compared with a target laser current preset in the output value register 350 by the subtraction circuit 351 to generate a differential voltage value.

When the actual current value flowing through the semiconductor laser diode 345 is greater than the target current value, a large value is held in the laser current register 349 and compared with the value of the output value register 350 by the subtraction circuit 351 to output a small differential voltage value. The output provided from the counter 352 in each of the third voltage-PWM conversion circuits 338, 339, and 340 and the differential voltage value of the subtraction circuit 351 are compared through subtraction in the subtraction circuit 353, and a pulse is output when they become equal. Specifically, in the third voltage-PWM conversion circuit 338, the pulse is a reset pulse to the flip-flop 354 at an early position (a) indicated on 359 of FIG. 13, and is a pulse having a short width (c) indicated on 360, which is input to the FET 335, to release short-circuiting of the attenuation resistor 332 early. That is, if the timing output from the subtraction circuit 353 is early in the third voltage-PWM conversion circuits 338, 339, and 340, the attenuation resistors 332, 333, and 334 become effective for a long time via the FETs 335, 336, and 337, and a coil current rapidly attenuates, indicated by (c) on 361, for example.

When the actual current value flowing through the laser diode 345 is less than the target current value, a small value is held in the laser current register 349 and compared with the value of the output value register 350 through the subtraction circuit 351 to output a large differential voltage value. The output provided from the counter 352 in each of the third voltage-PWM conversion circuits 338, 339, and 340 and the differential voltage value of the subtraction circuit 351 are compared through subtraction in the subtraction circuit 353, and a pulse is output when they become equal. Specifically, in the third voltage-PWM conversion circuit 338, the pulse is a reset pulse to the flip-flop 354 at a delayed position (b) indicated on 359, and is a pulse having a long width (d) indicated on 360, which is input to the FET 335, and thus short-circuiting of the attenuation resistor 332 is continued. That is, if the timing output from the subtraction circuit 353 is delayed in the third voltage-PWM conversion circuits 338, 339, and 340, the attenuation resistors 332, 333, and 334 become ineffective for a long time via the FETs 335, 336, and 337 and reach a coil current that does not significantly attenuates, as indicated by (f) on 361, for example.

In FIG. 11, when the switching elements 326, 327, and 328 on the reflux side are ON, the current iL (i1, i2, i3) flowing through the coils 341, 342, and 343 becomes a decrease amount iLOFF represented by the following formula after T seconds where the laser output voltage is VO, the resistance value of the attenuation resistors 332, 333, and 334 is Rd (0 in the case of short-circuit), and the inductance of the coils 341, 342, and 343 is L.

$$iLOFF = -(VO + Rd \times iL) \times T/L$$

As a result, when the value of Rd is large, the coil current is greatly attenuated, and thus the coil current can be controlled by a means for appropriately increasing and decreasing the value of Rd. When the coil current is maintained, decrease in the coil current can be reduced by lengthening the time for which the values of the attenuation resistors 332, 333, and 334 are 0 or a small value. When the coil current is to be decreased, decrease in the coil current can be increased by increasing the time for which the values of the attenuation resistors 332, 333, and 334 are enabled or increased.

That is, the sum of the currents flowing through the plurality of coils can be controlled to be a target value by a control means for short-circuiting or lowering the values of the attenuation resistors when the output current is small and enabling or increasing the values of the attenuation resistors when the output current is large.

The influence of variation in the applied voltage of the semiconductor laser diode 345 and change in the current waveform controlled by the attenuation resistors is insignificant, and ripples can be maintained at a value of about 1%, and thus there is no problem in driving the semiconductor laser diode.

As a second application example of the switching power supply of the fourth embodiment that changes a rate of decrease of the currents flowing through the coils by a means for changing resistance values inserted in the switching elements, a switching power supply characterized by accelerating falling will be described below with reference to FIGS. 11 to 14.

When a laser output current of a switching power supply is cut off, the laser output current does not decrease rapidly due to residual energy stored in a coil and a capacitor. In order to more rapidly reduce the laser output current, a means for consuming the energy stored in the coil by inserting an attenuation resistor into a reflux circuit is effective.

A method of rapidly cutting off a supply state of a laser output current will be described with reference to FIG. 14.

Figure 14:
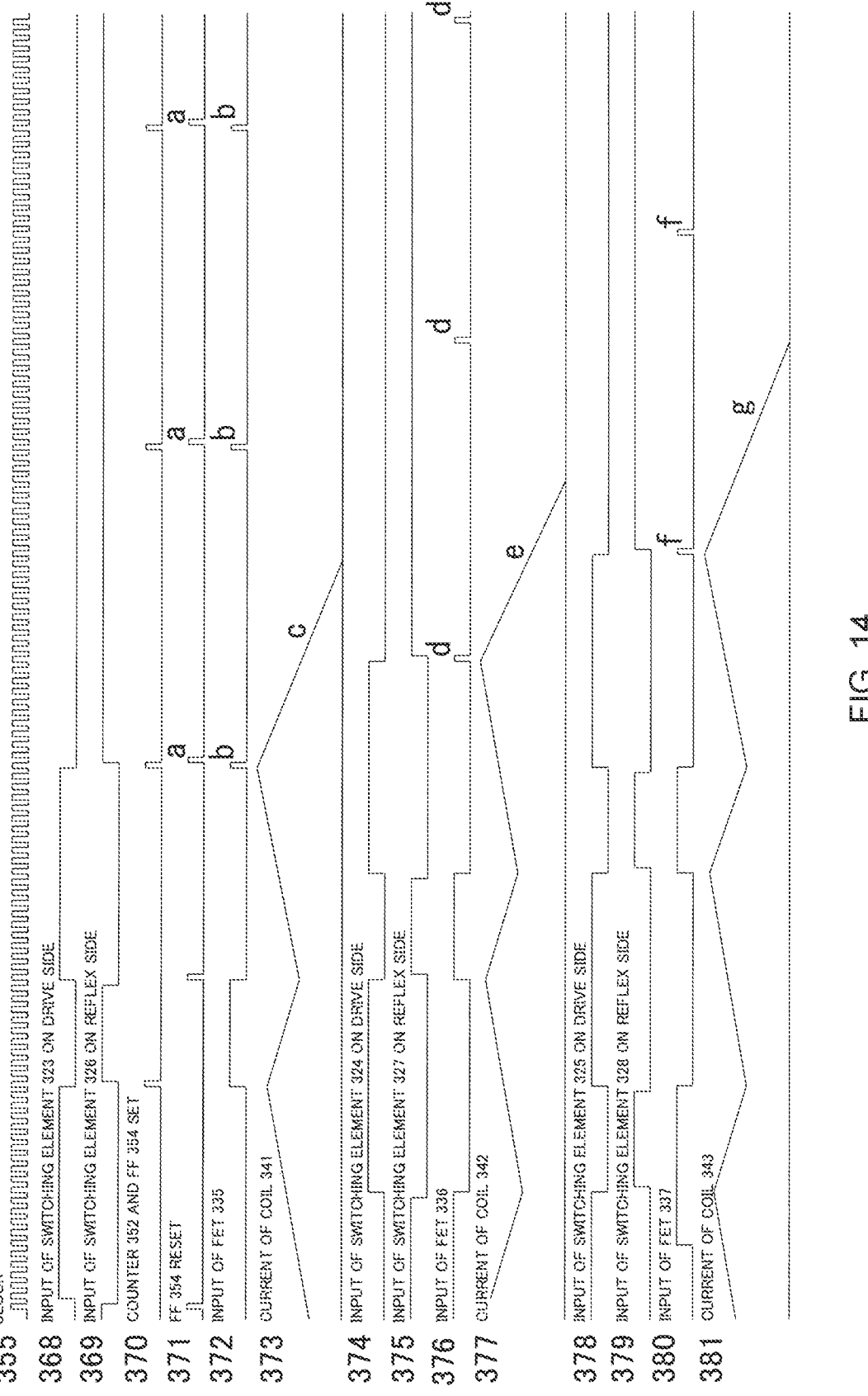
FIG. 14 is a diagram illustrating another operation timing of the switching power supply in the fourth embodiment of the present invention.

At the time of supplying the laser output current, as indicated by the first half portions of 368 and 369, 374 and 375, and 378 and 379 of FIG. 14, the laser diode 345 is driven by operating the switching element 323 on the drive side and the switching element 326 on the reflux side, the switching element 324 on the drive side and the switching element 327 on the reflux, and the switching element 325 on the drive side and the switching element 328 on the reflux side through the timing generator 319. Further, the third voltage-PWM conversion circuits 338, 339, and 340 are operated to control the sum of the currents flowing through the plurality of coils 341, 342, 343 to be a target value at the timing illustrated in FIG. 13. At this time, the attenuation resistors 332, 333, and 334 are in a state where a short-circuit time is long, and the attenuation of the coil currents is insignificant.

Next, when the laser output current of the switching power supply is cut off, the operation of the switching element 323 on the drive side is stopped through the timing generator 319 as indicated by the latter half portion of 368 of FIG. 14, and the switching element 326 on the reflux side is operated as indicated by the latter half portion of 369. Further, the third voltage-PWM conversion circuit 338 is operated, the counter 352 and the flip-flop 354 are set at a timing indicated by 370 in FIG. 14, and the flip-flop 354 is reset at an early timing of the position (a) at a timing indicated by 371. In this way, as indicated by (b) of 372, the input to the FET 335 is OFF for a long time to enable the attenuation resistor 332. That is, the attenuation resistor 332 is in a state in which a time for which the resistance value is high is long, and thus attenuation of the current i1 flowing through the coil 341 is significant as indicated by (c) of 373.

Similarly, the operation of the switching element 324 on the drive side is stopped through the timing generator 319 as indicated by the latter half portion of 374 of FIG. 14, and the switching element 327 on the reflux side is operated as indicated by the latter half portion of 375. Further, the third voltage-PWM conversion circuit 339 is operated similarly to the third voltage-PWM conversion circuit 338, and the input of the FET 336 is OFF for a long time as indicated by (d) of 376 to enable the attenuation resistor 333. That is, the attenuation resistor 333 is in a state in which a time for which the resistance value is high is long, and thus attenuation of the current i2 flowing through the coil 342 is significant as indicated by (c) of 377.

Similarly, the operation of the switching element 325 on the drive side is stopped through the timing generator 319 as indicated by the latter half portion of 378 of FIG. 14, and the switching element 328 on the reflux side is operated as indicated by the latter half portion of 379. Further, the third voltage-PWM conversion circuit 340 is operated similarly to the third voltage-PWM conversion circuit 338, and the input of the FET 337 is OFF for a long time as indicated by (f) of 380 to enable the attenuation resistor 334. That is, the attenuation resistor 334 is in a state in which a time for which the resistance value is high is long, and thus attenuation of the current i3 flowing through the coil 343 is significant as indicated by (g) of 381.

That is, when the laser current is cut off, the currents of the coils 341, 342, and 343 can be reduced by enabling the attenuation resistors 332, 333, and 334, and the laser output current can be rapidly reduced.

Here, only one set of an attenuation resistor and an FET for controlling the attenuation resistor is provided for each coil or switching element, needless to say, a wide range of control can be performed by providing a plurality of attenuation resistors such as the attenuation resistor 332 and a plurality of FETs such as the FET 335 for controlling the attenuation resistors to variously change the values of the attenuation resistors, or by providing a means for continuously changing the values in a first application example and a second application example of a means for changing the resistance values inserted in the switching elements.

A high-speed switching power supply characterized in that a resonance frequency determined by a coil and a capacitor is 0.1 times or more a switching frequency will be described below with reference to FIGS. 1 to 3 of the first embodiment of the present invention.

As indicated by the coil current 45 in FIG. 2, a current flowing through a coil increases and decreases in a triangular wave shape having a switching frequency determined by 43. This increase and decrease in the current cause large ripples in the output voltage and the output current, and thus the output voltage and the output current do not become constant. In order to avoid this, in the conventional switching power supply, the values of the inductance L of the coil 36 and the capacitance C of the capacitor 40 in FIG. 1 are set to sufficiently small values with respect to the switching frequency determined by 43. That is, values satisfying the following formula are set. Specifically, an LC resonance frequency of 1 kHz or less with respect to a switching frequency of 300 kHz is set.

$$LC \text{ resonance frequency} = 1/\left(2\pi\sqrt{(LC)}\right) << 0.1 \times \text{switching frequency}$$

However, in the first embodiment according to the present invention, values satisfying the following formula are set. Specifically, it is desirable that an LC resonance frequency of about 300 kHz, which is equivalent to a switching frequency of 300 kHz, be set.

$$LC \text{ resonance frequency} = 1/\left(2\pi\sqrt{(LC)}\right) \geq 0.1 \times \text{switching frequency}$$

As described above, the inductance of a coil and the capacitance of a capacitor are extremely reduced in the high-speed switching power supply according to the present invention, but ripples can be eliminated by setting or selecting a power supply voltage and equalizing the total amount of increases and the total amount of decreases of the currents flowing through the plurality of coils, as illustrated in FIG. 3. In addition, it is considered that the output voltage and the output current can be rapidly raised by extremely reducing the inductance of a coil and the capacitance of a capacitor, and a large feature that the conventional switching power supply does not have is obtained.

A high-speed switching power supply characterized in that the number of phases is increased or decreased during rising or according to an output current will be described below.

Figure 15:
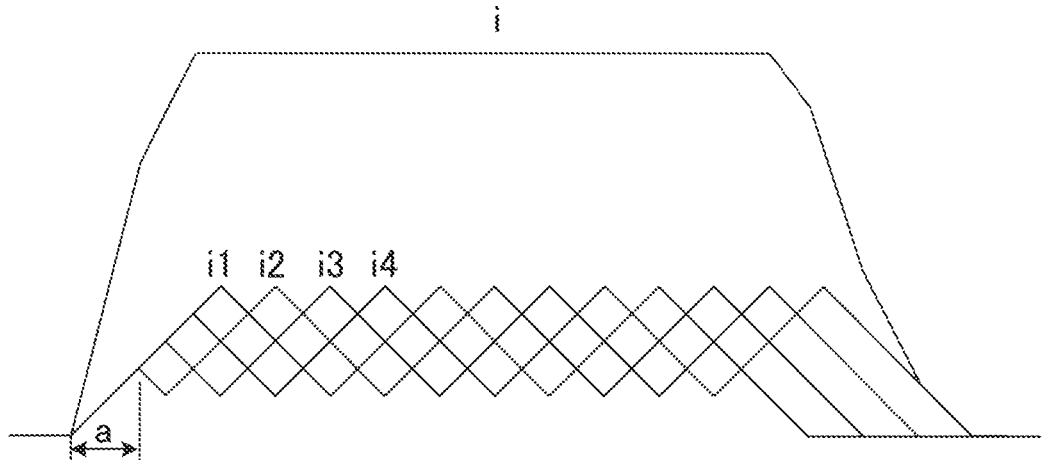
FIG. 15 is a diagram illustrating enhancement of a rising speed of a switching power supply of the present invention.

As a first application example of increasing or decreasing the number of phases, a switching power supply characterized in that a plurality of switching elements are simultaneously turned on at the time of rising to accelerate rising will be described below with reference to FIGS. 3 and 15. In FIG. 3, the switching elements 24, 25, 26, and 27 on the drive side and the switching elements 28, 29, 30, and 31 on the reflux side in FIG. 1 are sequentially operated to generate a laser output current. Meanwhile, in a part (a) of FIG. 15, the switching elements 24, 25, 26, and 27 on the drive side in FIG. 1 are simultaneously operated, and currents i1, i2, i3 and i4 are caused to flow through the coils 36, 37, 38, and 39. That is, in this part, a current i of 4 times flows into the capacitor 40, and a rapidly rising laser output current is obtained. Therefore, in FIG. 15, the rise time is shortened to ¼ as compared with FIG. 3. When the elapsed time or the voltage between both ends of the capacitor 40 exceeds a predetermined value during rising, the laser output current can obtain a rapid rise time without overshoot according to a means for returning to the control method of FIG. 3.

Figure 16A:
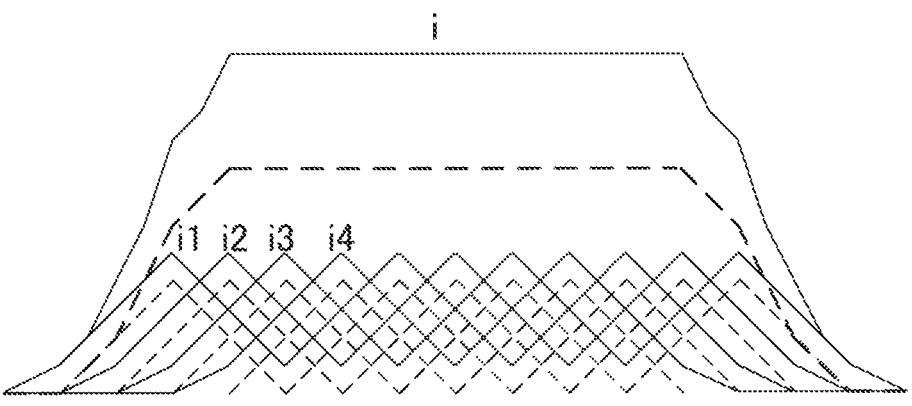
FIGS. 16A to 16C are diagrams for describing reduction in the number of phases and reduction in a clock cycle in a low current region of the switching power supply of the present invention.
Figure 16B:
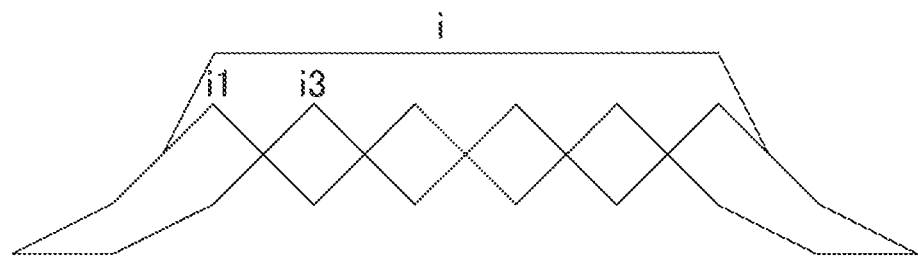

A switching power supply characterized in that the number of phases is increased or decreased depending on an output current will be described using FIGS. 16A and 16B as a second application example of increasing or decreasing the number of phases. FIG. 16A illustrates, as a laser output current i, the sum of coil currents i1, i2, i3, and i4 indicated by solid lines in the switching power supply using coils of four phases illustrated in FIG. 1. On the other hand, when the value of the laser current i to be output is decreased as indicated by a broken line, entire triangular waves of the coil currents i1, i2, i3, and i4 shift to low values as indicated by broken lines, and the low portions of the triangular waves become 0. When the value of the laser current i to be output is further decreased, a time for which the coil currents i1, i2, i3, and i4 are 0 occurs. The switching power supply has a property of causing discontinuous change in the output voltage when the output current decreases and the currents flowing through the coils 36, 37, 38, and 39 continue to have a value of 0, and ripples increase. As a method for avoiding such a situation, if the timing generator 19 in the first embodiment is controlled and a laser current is supplied using the coils 36 and 38 of two phases instead of being supplied using coils of four phases as illustrated in FIG. 16B, for example, the current is halved, for example, and thus, for example, it is possible to maintain the same triangular wave value as the coil currents. When the output current is reduced as described above, the means for reducing the number of phases is effective.

Figure 16C:
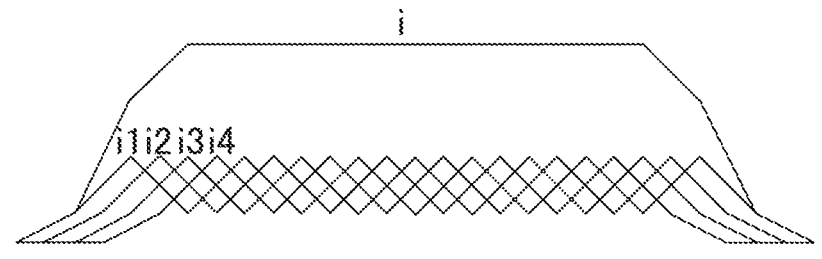

A high-speed switching power supply characterized in that a clock cycle is changed in response to an output current will be described below with reference to FIGS. 16A and 16C. FIG. 16A illustrates, as a laser output current i, the sum of coil currents i1, i2, i3, and i4 indicated by solid lines in the switching power supply using coils of four phases illustrated in FIG. 1. On the other hand, when the value of the laser current i to be output is decreased as indicated by a broken line, entire triangular waves of the coil currents i1, i2, i3, and i4 shift to low values as indicated by broken lines, and the low portions of the triangular waves become 0. When the value of the laser current i to be output is further decreased, a time for which the coil currents i1, i2, i3, and i4 are 0 occurs. The switching power supply has a property of causing discontinuous change in the output voltage when the output current decreases and the currents flowing through the coils 36, 37, 38, and 39 are continuously 0, and ripples increase. As a method of avoiding such a situation, the timing generator 19 in the first embodiment is controlled to reduce the clock cycle and decrease the amplitudes of the currents i1, i2, i3, and i4 flowing through the coils 36, 37, 38, and 39, as illustrated in FIG. 16C. In FIG. 16C, if the clock cycle is halved and the laser current i is supplied, for example, the current is halved, and thus a triangular wave that does not become 0 can be maintained. When the output current is reduced as described above, the means for reducing the clock cycle is effective.

An operation of aligning current values in a high-speed switching power supply characterized by including a means for aligning current values flowing through a plurality of coils will be described below with reference to FIG. 17.

Figure 17:
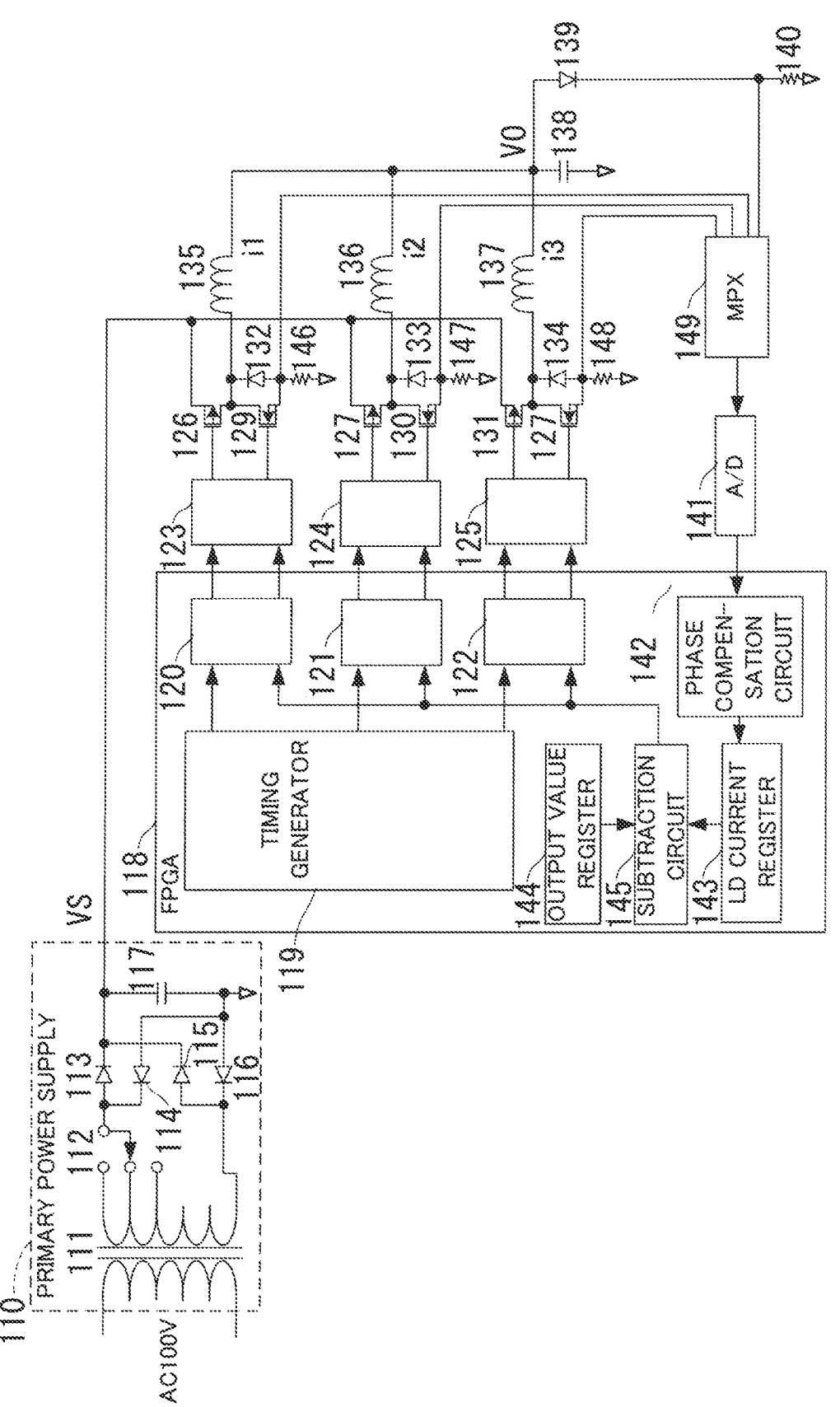
FIG. 17 is a diagram illustrating a method for aligning currents of the switching power supply of the present invention.

In FIG. 17, the configuration and operation from 110 to 145 are similar to those of the second embodiment described with reference to FIG. 4, and thus description thereof will be omitted. Micro-resistors 146, 147, and 148 are inserted in series with the switching elements 129, 130, and 131 on the reflux side and the diodes 132, 133, and 134 on the reflux side. A multiplexer 149 selects a voltage generated in the micro-resistors 146, 147, and 148, and sends the selected voltage to the A/D converter 141.

Due to variation in a component constant, the current of each phase is likely to vary in the multi-phase switching power supply. If there are a coil with a large current and a coil with a small current, there is a case where the current becomes 0 in the coil with a small current, and ripples occur in the laser output current. Therefore, the current flowing through each coil can be made uniform by a means for measuring reflux currents generated in the micro-resistors 146, 147, and 148 by switching the multiplexer 149, causing a current to flow for a short time to the drive-side switching element (driving for a short time the drive-side switching element) of a coil in which the current is larger than the average value of the current flowing through each of the coils 135, 136, and 137, and causing a current to flow for a long time to the drive-side switching element (driving for a long time the drive-side switching element) of a coil in which the current is smaller than the average value of the current flowing through each of the coils.

Similarly, the current flowing through each coil can be made uniform by a means for changing the power supply voltage or a means for changing the resistance values inserted in the reflux circuit. The micro-resistors 146, 147, and 148 can be regarded as the attenuation resistors 332, 333, and 334 in FIG. 11, and by controlling the third voltage-pulse width modulation (PWM) conversion circuits 388, 339, and 340 to turn off the FETs 335, 336, and 337 and measuring the reflux currents generated in the attenuation resistors 332, 333, and 334 through the multiplexer, the current flowing through each of the coils 135, 136, and 137 can be made uniform similarly.

A phase compensation operation with respect to a switching power supply in which phase compensation is realized by digital control will be described with reference to FIG. 18.

Figure 18:
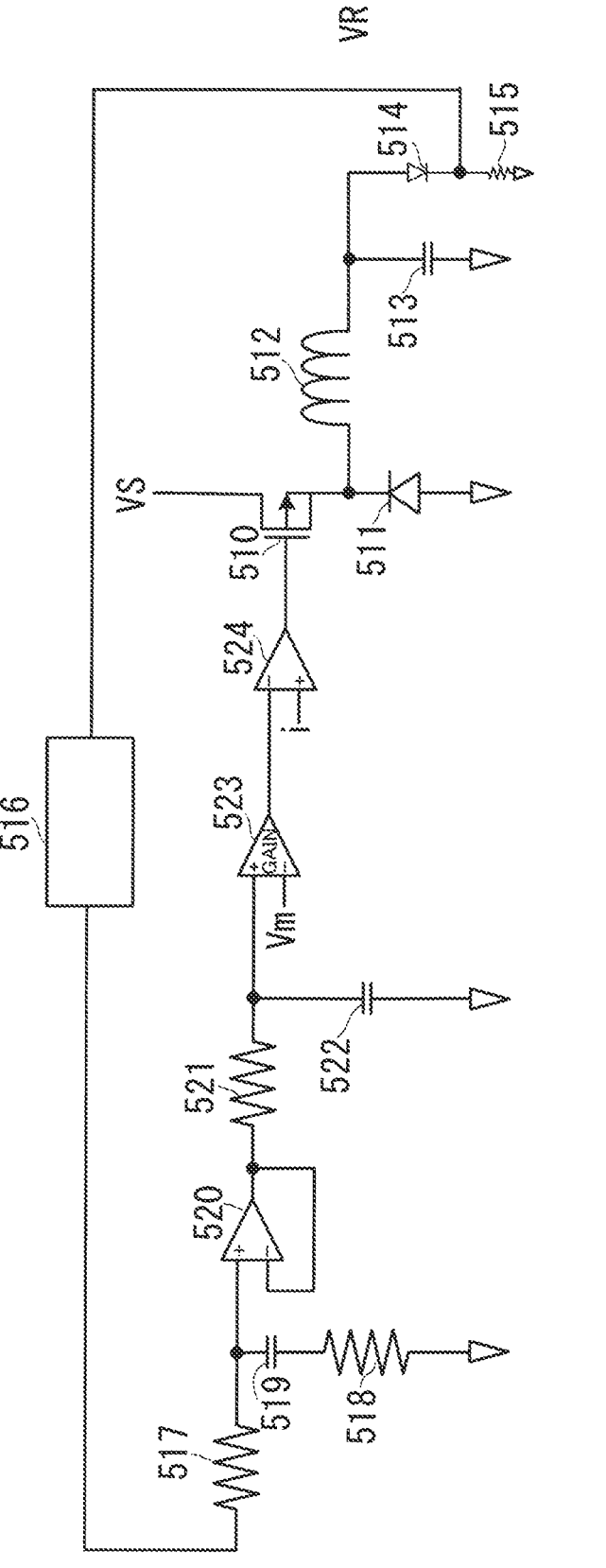
FIG. 18 is a diagram illustrating a configuration of phase compensation of the switching power supply of the present invention.

In FIG. 18, a switching element 510 is the switching element 126, 246, or 323 on the drive side in FIGS. 4, 7, and 11, a diode 511 is the diode 132 on the reflux side or the switching element 129 on the reflux side, the diode 252 on the reflux side or the switching element 249 on the reflux side, the diode 329 on the reflux side or the switching element 326 on the reflux side in FIGS. 4, 7, and 11, a coil 512 is the coil 135, the coil 255, or the coil 341 in FIGS. 4, 7, and 11, a capacitor 513 is the capacitor 138, the capacitor 258, or the capacitor 344 in FIGS. 4, 7, and 11, a semiconductor laser diode 514 is the semiconductor laser diode 139, the semiconductor laser diode 259, the semiconductor laser diode 345 in FIGS. 4, 7, and 11, and a current detection resistor 515 is the current detection resistor 140, the current detection resistor 260, or the current detection resistor 346 in FIGS. 4, 7, and 11. Similarly to FIGS. 4, 7, and 11, the switching element 510, the diode 511, and the coil 512 can be added in parallel depending on the number of phases constituting the circuit. A delay element 516 includes delays in the A/D converter 141, the A/D converter 261, and the A/D converter 347 that receive the output current in FIGS. 4, 7, and 11, and delays associated with calculations in the FPGA 118, the FPGA 232, and the FPGA 318. Resistors 517 and 518 are resistors for phase compensation, a capacitor 519 defines a stepped phase compensation characteristic in combination with the resistors 517 and 518, an amplifier 520 has a gain of 1, a resistor 521 is a resistor for phase compensation, a capacitor 522 defines a phase compensation characteristic that falls in a high frequency in combination with the resistor 521, and the resistor 517, the resistor 518, the capacitor 519, the amplifier 520, the resistor 521, and the capacitor 522 constitute the phase compensation circuit 142, the phase compensation circuit 262, and the phase compensation circuit 348 of FIGS. 4, 7, and 11, and provide an output of phase compensation. An amplifier 523 having a gain of GAIN corresponds to the subtraction circuit 145, the subtraction circuit 265, and the subtraction circuit 351 in FIGS. 4, 7, and 11 and obtains a difference between the output of phase compensation and a target current value Vm. A comparator 524 corresponds to the subtraction circuits 147, 267, and 353 in FIGS. 5, 8, and 12, receives the output of the amplifier 523 through a negative terminal, and outputs, through a positive terminal, a pulse having a time width proportional to the output of the amplifier 523 by a means for applying a triangular wave having a cycle. The delay element 516, the amplifier 520, the amplifier 523, and the comparator 524 constitute a negative feedback loop for making the output voltage VR of the current detection resistor 515 constant. The resistor 517, the resistor 518, the capacitor 519, the resistor 521, and the capacitor 522 define frequency characteristics of the amplifier 523, and a lag/lead compensation method is configured by the digital circuit of the FPGA 118 in FIG. 4, the FPGA 232 in FIG. 7, and the FPGA 318 in FIG. 11, to eliminate an oscillation element delayed from the signal VR through a delay circuit of a negative feedback signal. If strong negative feedback is enabled by eliminating the oscillation element, an accurate current output can be obtained. As a further advantage, the high-speed switching power supply is affected by an object to be processed at the time of processing a semiconductor laser diode serving as a load at the time of startup, and is affected by various fluctuations at the time of falling. In order to cope with this variation, digital phase compensation that can dynamically change the phase compensation characteristic according to a situation is an effective means.

If the semiconductor laser diode is driven using the switching power supply according to the present invention, it is possible to provide a method for obtaining a sufficiently clean power supply output without ripples with a high-speed rise time. If high-speed pulse driving is possible, precise laser processing can be realized, and further, efficiency improvement, downsizing, and cost reduction can be achieved by a means for adopting a switching power supply.

By means of applying the high-speed switching power supply according to the present invention to a power supply for driving a laser, a laser processing machine with high processability can be realized by a small and highly efficient power supply. Further, the present invention is easily applied to other applications requiring a high-speed rise time.

What is claimed is:

1. A high-speed switching power supply comprising:
a primary power supply;
a plurality of switching elements connected to the primary power supply;
a plurality of coils connected to the plurality of switching elements; and
one capacitor connected to the plurality of coils;
wherein each of the plurality of switching elements includes a switching element on a driving-side and another switching element on a freewheeling side;
wherein for a given time the plurality of coils includes a number N of active phases and wherein currents flowing within the number N of active phases have identical waveforms, their phases being shifted by $2\pi/N$, and a number of phases in which the currents have increased during the given time is NON and a number of phases in which the currents have decreased during the given time is NOFF, where NON and NOFF satisfy NON+NOFF=the number N of active phases, and the number N of active phases is equal to or greater than 2;
wherein a primary power supply voltage of the primary power supply is set or selected according to the number N of active phases so as to satisfy a value of a target output voltage×(1+(NOFF/NON)), and such that a sum of the current flowing through the plurality of coils remains constant; and
an auxiliary power supply for applying an auxiliary power supply voltage to the switching element, the auxiliary power supply voltage of the auxiliary power supply being different from the primary power supply voltage of the primary power supply, wherein the primary power supply and the auxiliary power supply are alternately connected to the switching element such that, when the currents have increased during the given time, a connection is switched from the primary power supply to the auxiliary power supply to change the primary power supply voltage of the primary power supply and thereby the sum of the currents flowing through the plurality of coils is controlled to a target value.

2. The high-speed switching power supply according to claim 1, further comprising a feedback circuit that outputs a deviation between an actual output current and a target output current, the feedback circuit being provided with phase compensation, the phase compensation being implemented by digital control.

3. The high-speed switching power supply according to claim 2, wherein the phase compensation eliminates oscillation in the actual output current.

4. A high-speed switching power supply comprising:
a primary power supply;
a plurality of switching elements connected to the primary power supply;
a plurality of coils connected to the plurality of switching elements;
one capacitor connected to the plurality of coils;
wherein each of the plurality of switching elements includes a switching element on a driving-side and another switching element on a freewheeling side;
wherein for a given time the plurality of coils includes a number N of active phases and wherein currents flowing within the number N of active phases have identical waveforms, their phases being shifted by $2\pi/N$, and a number of phases in which the currents have increased during the given time is NON and a number of phases in which the currents have decreased during the given time is NOFF, where NON and NOFF satisfy NON+NOFF=N, and the number N of active phases is equal to or greater than 2;
wherein a primary power supply voltage of the primary power supply is set or selected according to the number N of active phases so as to satisfy a value of a target output voltage×(1+(NOFF/NON)), and such that a sum of the current flowing through the plurality of coils remains constant; and
an auxiliary power supply for applying to the switching elements an auxiliary power supply voltage higher than the primary power supply voltage of the primary power supply, wherein the primary power supply and the auxiliary power supply are alternately connected to the switching element to change the primary power supply voltage from the primary power supply and thereby an increase of an output current is accelerated, wherein a connection time of the primary power supply is gradually lengthened.

5. The high-speed switching power supply according to claim 4, further comprising a feedback circuit that outputs a deviation between an actual output current and a target output current, the feedback circuit being provided with phase compensation, the phase compensation being implemented by digital control.

6. The high-speed switching power supply according to claim 5, wherein the phase compensation eliminates oscillation in the actual output current.

7. A high-speed switching power supply comprising:

a primary power supply;

a plurality of switching elements connected to the primary power supply;

a plurality of coils connected to the plurality of switching elements; and one capacitor connected to the plurality of coils;

wherein each of the plurality of switching elements includes a switching element on a driving-side and another switching element on a freewheeling side;

wherein for a given time the plurality of coils includes a number N of active phases and wherein currents flowing within the number N of active phases have identical waveforms, their phases being shifted by $2\pi/N$, and a number of phases in which the currents have increased during the given time is NON and a number of phases in which the currents have decreased during the given time is NOFF, where NON and NOFF satisfy NON+NOFF=N, and the number N of active phases is equal to or greater than 2; and wherein a power supply voltage of the primary power supply is set or selected according to the number N of active phases so as to satisfy a value of a target output voltage$\times$(1+(NOFF/NON)), and such that a sum of the current flowing through the plurality of coils remains constant, the switching elements on the freewheeling side having resistors connected thereto, respectively, and resistance values of the resistors being changed, thereby the sum of the currents flowing through the plurality of coils being controlled to a target value.

8. The high-speed switching power supply according to claim 7, further comprising a feedback circuit that outputs a deviation between an actual output current and a target output current, the feedback circuit being provided with phase compensation, the phase compensation being implemented by digital control.

9. The high-speed switching power supply according to claim 8, wherein the phase compensation eliminates oscillation in the actual output current.

10. A high-speed switching power supply comprising:

a primary power supply;

a plurality of switching elements connected to the primary power supply;

a plurality of coils connected to the plurality of switching elements; and one capacitor connected to the plurality of coils;

wherein each of the plurality of switching elements includes a switching element on a driving-side and another switching element on a freewheeling side;

wherein for a given time the plurality of coils includes a number N of active phases and wherein currents flowing within the number N of active phases have identical waveforms, their phases being shifted by $2\pi/N$, and a number of phases in which the currents have increased during the given time is NON and a number of phases in which the currents have decreased during the given time is NOFF, where NON and NOFF satisfy NON+NOFF=N, and the number N of active phases is equal to or greater than 2; and wherein a power supply voltage of the primary power supply is set or selected according to the number N of active phases so as to satisfy a value of a target output voltage$\times$(1+(NOFF/NON)), and such that a sum of the current flowing through the plurality of coils remains constant, the switching elements on the freewheeling side having resistors connected thereto, respectively, and resistance values of the resistors being changed, thereby an output current being rapidly decreased.

11. The high-speed switching power supply according to claim 10, further comprising a feedback circuit that outputs a deviation between an actual output current and a target output current, the feedback circuit being provided with phase compensation, the phase compensation being implemented by digital control.

12. The high-speed switching power supply according to claim 11, wherein the phase compensation eliminates oscillation in the actual output current.

* * * * *